(12) United States Patent
Tabirian et al.

(10) Patent No.: US 11,175,441 B1
(45) Date of Patent: Nov. 16, 2021

(54) POLARIZATION-INDEPENDENT DIFFRACTIVE OPTICAL STRUCTURES

(71) Applicant: Beam Engineering for Advanced Measurements Co., Orlando, FL (US)

(72) Inventors: Nelson V. Tabirian, Winter Park, FL (US); David E. Roberts, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 327 days.

(21) Appl. No.: 16/293,122

(22) Filed: Mar. 5, 2019

Related U.S. Application Data

(60) Provisional application No. 62/638,651, filed on Mar. 5, 2018.

(51) Int. Cl.
*G02B 5/30* (2006.01)
*G02B 5/18* (2006.01)
*G02B 27/42* (2006.01)

(52) U.S. Cl.
CPC ......... *G02B 5/1833* (2013.01); *G02B 5/1866* (2013.01); *G02B 5/3025* (2013.01); *G02B 5/3083* (2013.01); *G02B 27/4205* (2013.01)

(58) Field of Classification Search
CPC .. G02B 5/1833; G02B 5/1866; G02B 5/3025; G02B 5/3083; G02B 27/4205; G02B 1/08; G02B 5/18; G02B 2005/1804; G02B 5/1814; G02B 5/1828; G02B 5/1871; G02B 5/30; G02B 5/3016; G02B 5/32; G02B 26/08; G02B 26/0808; G02B 27/106; G02B 27/1086; G02B 27/28; G02B 27/283;
(Continued)

(56) References Cited

U.S. PATENT DOCUMENTS

| 2,435,616 A | 2/1948 | Vittum |
| 3,721,486 A | 3/1973 | Bramley |

(Continued)

FOREIGN PATENT DOCUMENTS

| EP | 1970734 | 9/2008 |
| EP | 2088456 | 12/2009 |

(Continued)

OTHER PUBLICATIONS

Anderson, G., et al., Broadband Antihole Photon Sieve Telescope, Applied Optics, vol. 16, No. 18., Jun. 2007, 3 pages.

(Continued)

*Primary Examiner* — Arnel C Lavarias
(74) *Attorney, Agent, or Firm* — Brian S. Steinberger; Hilary F. Steinberger; Law Offices of Brian S. Steinberger, P.A.

(57) ABSTRACT

Diffractive optical structures, lens, waveplates, systems and methods of combinations of CDWs (cycloidal diffractive waveplates) and PVGs (polarization volume gratings) that result in high efficiency polarization-insensitive diffraction. Although our modelling and experiments were performed for structures with optical axis orientation periodic along one of the Cartesian coordinates parallel to the plane of the structure, the results are applicable to more complex structures such as diffractive waveplate lenses. The focusing performance of such structures can be predicted by considering the structure to be locally periodic along one axis.

15 Claims, 15 Drawing Sheets

(58) Field of Classification Search
CPC .. G02B 27/286; G02B 27/42; G02B 27/4272;
G02F 1/133528; G02F 1/133531; G02F
1/133538
USPC ..... 359/486.01, 573, 558, 566, 569, 483.01,
359/485.05, 487.03, 489.01, 489.06,
359/489.09, 489.08, 489.15, 490.01,
359/490.02, 490.03; 349/1, 18, 193, 194,
349/201, 202; 362/19; 353/20
See application file for complete search history.

(56) References Cited

U.S. PATENT DOCUMENTS

| | | | |
|---|---|---|---|
| 3,897,136 A | 7/1975 | Bryngdahl | |
| 4,160,598 A | 7/1979 | Firester et al. | |
| 4,301,023 A | 11/1981 | Schuberth | |
| 4,698,816 A | 10/1987 | Chun | |
| 4,956,141 A | 9/1990 | Allen | |
| 4,983,332 A | 1/1991 | Hahn | |
| 5,032,009 A | 7/1991 | Gibbons | |
| 5,042,950 A | 8/1991 | Salmon, Jr. | |
| 5,047,847 A | 9/1991 | Toda | |
| 5,100,231 A | 3/1992 | Sasnett et al. | |
| 5,142,411 A | 8/1992 | Fiala | |
| 5,150,234 A | 9/1992 | Takahashi | |
| 5,218,610 A | 6/1993 | Dixon | |
| 5,321,539 A | 6/1994 | Hirabayashi | |
| 5,325,218 A | 6/1994 | Willett | |
| 5,446,596 A | 8/1995 | Mostrorocco | |
| 5,619,325 A | 4/1997 | Yoshida | |
| 5,621,525 A | 4/1997 | Vogeler et al. | |
| 5,712,721 A | 1/1998 | Large | |
| 5,895,422 A | 4/1999 | Hauber | |
| 5,903,330 A | 5/1999 | Funschilling | |
| 5,907,435 A | 5/1999 | Ang | |
| 5,989,758 A | 11/1999 | Komatsu | |
| 6,091,471 A | 7/2000 | Kim | |
| 6,107,617 A | 8/2000 | Love et al. | |
| 6,139,147 A | 10/2000 | Zhang | |
| 6,170,952 B1 | 1/2001 | La Haye et al. | |
| 6,191,880 B1 | 2/2001 | Schuster | |
| 6,219,185 B1 | 4/2001 | Hyde | |
| 6,320,663 B1 | 11/2001 | Ershov | |
| 6,373,549 B1 | 4/2002 | Tombling et al. | |
| 6,452,145 B1 | 9/2002 | Graves et al. | |
| 6,551,531 B1 | 4/2003 | Ford | |
| 6,678,042 B2 | 1/2004 | Tabirian et al. | |
| 6,728,049 B1 | 4/2004 | Tabirian et al. | |
| 6,792,028 B2 | 9/2004 | Cook | |
| 6,810,169 B2 | 10/2004 | Bouevitch | |
| 6,911,637 B1 | 6/2005 | Vorontsov et al. | |
| 7,048,619 B2 | 5/2006 | Park | |
| 7,094,304 B2 | 8/2006 | Nystrom | |
| 7,095,772 B1 | 8/2006 | Delfyett et al. | |
| 7,196,758 B2 | 3/2007 | Crawford | |
| 7,319,566 B2 | 1/2008 | Prince | |
| 7,324,286 B1 | 1/2008 | Glebov | |
| 7,450,213 B2 | 11/2008 | Kim et al. | |
| 7,482,188 B2 | 1/2009 | Moon | |
| 7,764,426 B2 | 7/2010 | Lipson | |
| 8,045,130 B2 | 10/2011 | Son | |
| 8,077,388 B2 | 12/2011 | Gerton | |
| 8,264,623 B2 | 9/2012 | Marrucci | |
| 8,339,566 B2 * | 12/2012 | Escuti | G02F 1/1337 349/187 |
| 8,520,170 B2 | 8/2013 | Escuti | |
| 8,582,094 B1 | 11/2013 | Shortt | |
| 8,643,822 B2 | 2/2014 | Tan et al. | |
| 8,937,701 B2 | 1/2015 | Rossini | |
| 8,982,313 B2 | 3/2015 | Escuti et al. | |
| 9,535,258 B1 | 1/2017 | Whiteaker | |
| 9,541,772 B2 | 1/2017 | De Sio et al. | |
| 9,557,456 B2 * | 1/2017 | Tabirian | G02B 27/4272 |
| 9,592,116 B2 | 3/2017 | De Sio et al. | |
| 9,617,205 B2 | 4/2017 | Tabirian et al. | |
| 9,658,512 B2 | 5/2017 | Tabirian et al. | |
| 9,715,048 B2 * | 7/2017 | Tabirian | G02B 27/4272 |
| 9,753,193 B2 | 9/2017 | Tabirian et al. | |
| 9,976,911 B1 | 5/2018 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 10,075,625 B2 | 9/2018 | Tabirian et al. | |
| 10,107,945 B2 | 10/2018 | Tabirian et al. | |
| 10,114,239 B2 | 10/2018 | Tabirian et al. | |
| 10,120,112 B2 | 11/2018 | Tabirian et al. | |
| 10,185,182 B2 | 1/2019 | Tabirian | |
| 10,191,191 B2 | 1/2019 | Tabirian et al. | |
| 10,191,296 B1 | 1/2019 | Tabirian et al. | |
| 10,197,715 B1 | 2/2019 | Tabirian et al. | |
| 10,274,650 B2 | 4/2019 | Tabirian et al. | |
| 10,274,805 B2 | 4/2019 | Tabirian et al. | |
| 10,330,947 B2 | 6/2019 | Tabirian et al. | |
| 2001/0002895 A1 | 6/2001 | Kawano | |
| 2001/0018612 A1 | 8/2001 | Carson et al. | |
| 2001/0030720 A1 | 10/2001 | Ichihashi | |
| 2002/0027624 A1 | 3/2002 | Seiberle | |
| 2002/0097361 A1 | 7/2002 | Ham | |
| 2002/0167639 A1 | 11/2002 | Coates | |
| 2003/0021526 A1 | 1/2003 | Bouevitch | |
| 2003/0072896 A1 | 4/2003 | Kwok | |
| 2003/0086156 A1 | 5/2003 | McGuire | |
| 2003/0137620 A1 | 7/2003 | Wang | |
| 2003/0152712 A1 | 8/2003 | Motomura | |
| 2003/0206288 A1 | 11/2003 | Tabirian et al. | |
| 2003/0214700 A1 | 11/2003 | Sidorin | |
| 2003/0218801 A1 | 11/2003 | Korniski et al. | |
| 2004/0051846 A1 | 3/2004 | Blum et al. | |
| 2004/0081392 A1 | 4/2004 | Li | |
| 2004/0105059 A1 | 6/2004 | Ohyama | |
| 2004/0165126 A1 | 8/2004 | Ooi et al. | |
| 2005/0030457 A1 | 2/2005 | Kuan et al. | |
| 2005/0110942 A1 | 5/2005 | Ide | |
| 2005/0219696 A1 | 10/2005 | Albert et al. | |
| 2005/0271325 A1 | 12/2005 | Anderson et al. | |
| 2005/0276537 A1 | 12/2005 | Frisken | |
| 2005/0280717 A1 | 12/2005 | Chen | |
| 2006/0008649 A1 | 1/2006 | Shinichiro | |
| 2006/0055883 A1 | 3/2006 | Morris et al. | |
| 2006/0109532 A1 | 5/2006 | Savas | |
| 2006/0221449 A1 | 10/2006 | Glebov et al. | |
| 2006/0222783 A1 | 10/2006 | Hayashi | |
| 2007/0032866 A1 | 2/2007 | Portney | |
| 2007/0040469 A1 | 2/2007 | Yacoubian | |
| 2007/0115551 A1 | 5/2007 | Spilman | |
| 2007/0122573 A1 | 5/2007 | Yasuike | |
| 2007/0132930 A1 | 6/2007 | Ryu et al. | |
| 2007/0247586 A1 | 10/2007 | Tabirian | |
| 2007/0258677 A1 | 11/2007 | Chigrinov | |
| 2008/0024705 A1 | 1/2008 | Hasegawa et al. | |
| 2008/0226844 A1 | 9/2008 | Shemo | |
| 2008/0278675 A1 | 11/2008 | Escuti | |
| 2009/0002588 A1 | 1/2009 | Lee et al. | |
| 2009/0052838 A1 | 2/2009 | McDowall | |
| 2009/0073331 A1 | 3/2009 | Shi | |
| 2009/0122402 A1 | 5/2009 | Shemo | |
| 2009/0141216 A1 | 6/2009 | Marrucci | |
| 2009/0201572 A1 | 8/2009 | Yonak | |
| 2009/0256977 A1 | 10/2009 | Haddock | |
| 2009/0257106 A1 | 10/2009 | Tan | |
| 2009/0264707 A1 | 10/2009 | Hendricks | |
| 2010/0003605 A1 | 1/2010 | Gil | |
| 2010/0066929 A1 | 3/2010 | Shemo | |
| 2010/0245954 A1 | 9/2010 | Ahling | |
| 2011/0069377 A1 | 3/2011 | Wu et al. | |
| 2011/0075073 A1 | 3/2011 | Oiwa | |
| 2011/0085117 A1 | 4/2011 | Moon et al. | |
| 2011/0097557 A1 | 4/2011 | May | |
| 2011/0109874 A1 | 5/2011 | Piers et al. | |
| 2011/0135850 A1 | 6/2011 | Saha et al. | |
| 2011/0188120 A1 | 8/2011 | Tabirian et al. | |
| 2011/0234944 A1 | 9/2011 | Powers | |
| 2011/0262844 A1 | 10/2011 | Tabirian | |
| 2012/0075168 A1 | 3/2012 | Osterhout et al. | |

(56) References Cited

U.S. PATENT DOCUMENTS

| | | |
|---|---|---|
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0011564 A1 | 1/2016 | Tanabe et al. |
| 2016/0023993 A1 | 1/2016 | Tabirian |
| 2016/0047955 A1 | 2/2016 | Tabirian et al. |
| 2016/0047956 A1 | 2/2016 | Tabirian et al. |
| 2016/0209560 A1 | 7/2016 | Tabirian et al. |
| 2016/0231592 A9 | 8/2016 | Beaton et al. |
| 2016/0270656 A1 | 9/2016 | Samec et al. |
| 2016/0282639 A1 | 9/2016 | von und zu Liechtenstein |
| 2016/0363484 A1 | 12/2016 | Barak et al. |
| 2016/0363783 A1 | 12/2016 | Blum |
| 2017/0010397 A1 | 1/2017 | Tabirian et al. |
| 2017/0307892 A1 | 10/2017 | Freeman et al. |
| 2017/0373459 A1* | 12/2017 | Weng .................... G02B 30/25 |
| 2019/0113377 A1 | 4/2019 | Johnston et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Early, J. et al., Twenty Meter Space Telescope Based on Diffractive Fresnel Lens, SPIE, U.S. Department of Energy, Lawrence Livermore National Laboratory, Jun. 2003, 11 pages.

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, No., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2007), 4 pages.

Nersisyan, S., et al., Polarization insensitive imaging through polarization gratins, Optics Express, vol. 17, No. 3, Feb. 2, 2009, 14 pages.

OISE, Optics in the Southeast, Technical Conference and Tabletop Exhibit, Optical Society of America, Orlando, FL., Nov. 12-13, 2003, 9 pages.

Dierking, Polymer Network-Stabilized Liquid Crystals, Advanced Materials, vol. 12, No. 3, 2000, 15 pages.

Pepper, M. et al, Nonlinear Optical Phase Conjugation, IEEE, Sep. 1991, pp. 21-34, 14 pages.

De Sio, L., et al., "Digital Polarization Holography Advancing Geometrical Phase Optics," 2016, Optics Express, vol. 24, Issue 16, pp. 18297-18306, 10 pages.

Borek, G. and D. Brown, "High-performance diffractive optics for beam shaping," 1999, Proceeding of SPIE, vol. 3633, pp. 51-60, 10 pages.

Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.

Marrucci, et al., Pancharatnam-Berry phase optical elements for wave front shaping in the visible domain, Appl. Phys. Lett. 88, 2006, 3 pages.

Sobolewska et al., "On the inscription of period and half period surface relief gratings in azobenzene-functionalized polymers", J. Phys. Chem., vol. 112 (15) Mar. 1, 2008, 10 pages.

Barrett et al., Model of laser driven mass transport in thin films of dye-functionalized polymers, J. Chem. Phys., vol. 109 (4), Jul. 22, 1998, 13 pages.

Vernon, J., et al, Recording Polarization Gratings with a Standing Spiral Wave, Applied Physics Letters, Oct. 2013, vol. 103, 4 pages.

Gerchberg, et al, practical algorithm for the determination of the phase from image and diffraction plane pictures, 1972, Optik, vol. 35, Issue 2, pp. 237-246, 10 pages.

Serak, et al. Diffractive Waveplate Arrays [Invited], Journal of the Optical Society of America B, May 2017, pp. B56-B63, vol. 34, No. 5, 8 pages.

Emoto, Optical and Physical Applications of Photocontrollable Materials: Azobenzene-Containing and Liquid Crystalline Polymers, Polymers,Jan. 2012, 150-186, vol. 4, 38 pages.

Tabiryan, et al., The Promise of Diffractive Waveplates, OPN Optics and Photonics News, Mar. 2010, 6 pages.

Tabiryan, et al., Fabricating Vector Vortex Waveplates for Coronagraphy; Aerospace Conference, 2012, EEE; publicly available Apr. 19, 2012, 12 pages.

Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.

Nersisyan, et al., Study of azo dye surface command photoalignment material for photonics applications, Applied Optics, vol. 49, No. 10, Apr. 1, 2010, 8 pages.

Nersisyan, et al., Characterization of optically imprinted polarization gratings, Applied Optics, vol. 48, No. 21, Jul. 20, 2009, 6 pages.

Nersisyan, et al., Fabrication of Liquid Crystal Polymer Axial Waveplates for UV-IR Wavelengths, Optics Express, vol. 17, No. 14, Jul. 2009, 9 pages.

Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.

Nersisyan, et al., Polarization insensitive imaging through polarization gratings, Optics Express, vol. 17, No. 3, Feb. 2, 2009, 14 pages.

Sarkissian, et al., Longitudinally modulated nematic bandgap structure, Optical Society of America, vol. 23, No. 8, Aug. 2008, 6 pages.

Sarkissian, et al., Polarization-universal bandgap in periodically twisted nematics, Optics Letters, vol. 31, No. 11, Jun. 1, 2006, abstract, 4 pages.

Sarkissian, et al., Periodically Aligned Liquid Crystal: Potential Application for Projection Displays, Mol. Cryst. Liq. Cryst., vol. 451, 2006, 19 pages.

Sarkissian, et al., Potential application of Periodically Aligned Liquid Crystal cell for projection displays, JThE12, 2005, 3 pages.

Sarkissian, et al., Polarization-Controlled Switching Between Diffraction Orders in Transverse-Periodically Aligned Nematic Liquid Crystals, Optics Letters, Aug. 2006, abstract, 4 pages.

Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.

Schadt , et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.

Schadt, et al., Optical patterning of multi-domain liquid-crystal displays with wide viewing angles, Nature, vol. 381, May 16, 1996, 4 pages.

(56) References Cited

OTHER PUBLICATIONS

Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process,Jpn. J. Appl. Phys., Part 1, vol. 42, 2003, 3 pages.
Roberts, D. et al, "Polarization-Independent Diffractive Waveplate Optics," Mar. 2018, IEEE Aerospace Conference, 11 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc, of SPIE, vol. 7775, 2010, 10 pages.
Heller, A Giant Leap for Space Telescopes, Foldable Optics, S&TR, Mar. 2003, 7 pages.
Beam Engineering For Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microorubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Weng, Y., et al., "Polarization Volume Grating With High Efficiency and Large Diffraction Angle", Optics Express, Aug. 8, 2016, 17746-17759, vol. 24, No. 16, 14 Pages.

* cited by examiner

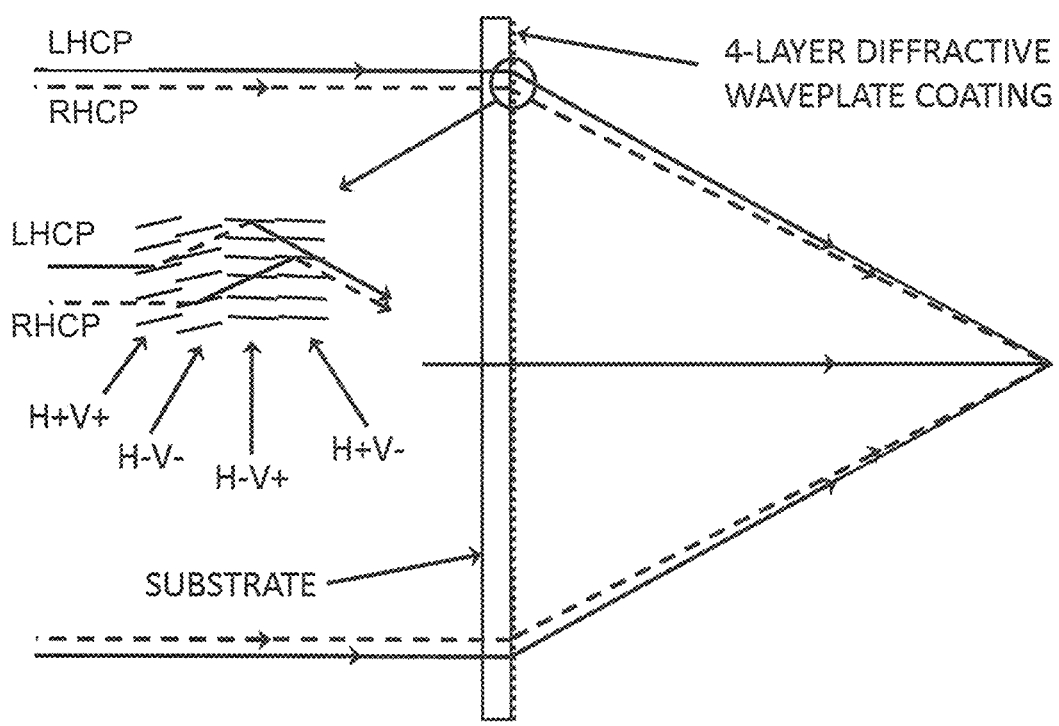
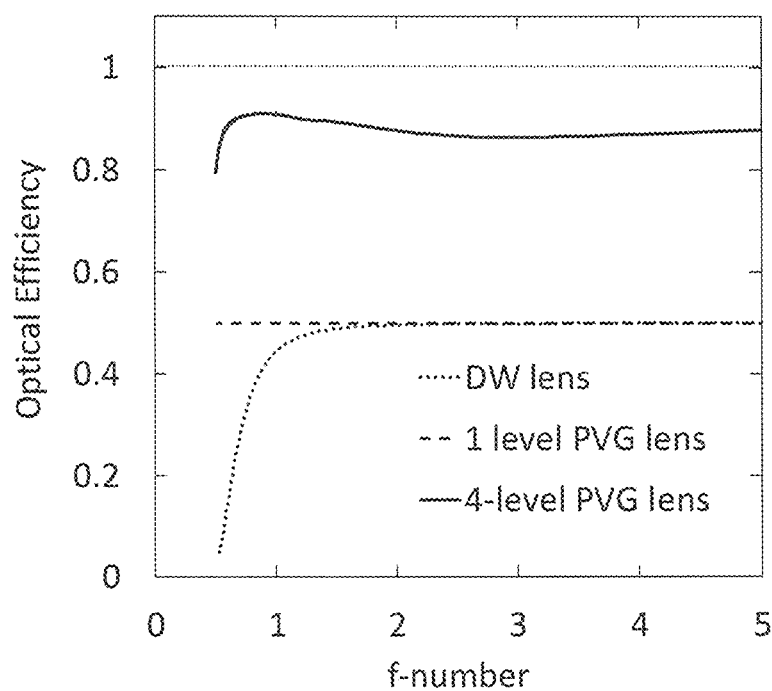
FIG. 16A
FIG. 16B

POLARIZATION-INDEPENDENT DIFFRACTIVE OPTICAL STRUCTURES

CROSS REFERENCE TO RELATED APPLICATIONS

This application claims the benefit of priority to U.S. Provisional Patent Application Ser. No. 62/638,651 filed Mar. 5, 2018, which is incorporated by reference in its entirety.

GOVERNMENT LICENSE RIGHTS

This invention was made with Government support under U.S. Air Force Research Laboratory contract FA8650-16-C-5411 awarded by the U.S. Air Force Research Laboratory. The government has certain rights in this invention.

FIELD OF THE INVENTION

This invention relates generally to the field of optics, and in particular to diffractive optical structures, lenses, waveplates, systems and methods, which have the same effect on light regardless of its polarization.

BACKGROUND OF THE INVENTION

Diffractive optical structures are used in many ways in optics. Common uses are as dispersive elements in spectrometers and in lens systems. In this context, an optical structure that is "dispersive" is one for which the effect on light reflecting from, or transmitting through, the optical structure is highly dependent on wavelength. For example, over a wide range of conditions, the angle through which light is diffracted by the simplest diffractive optical structures is approximately proportional to the wavelength. This is in contrast with the angle through which light is refracted by common optical refractive materials such as glass or transparent plastic. For such refractive materials, the angle through which light is refracted is nearly independent of the wavelength.

Many diffractive structures have effects on the propagation of light that are dependent on the polarization of the light. One of the major ways in which the effect on light of a diffractive structure can be dependent on polarization is that the efficiency with which light is diffracted into various diffraction orders can be dependent on polarization. Methods have been developed to assure that the efficiency of diffraction into all orders, and for all polarizations of light, is compatible with the intended application. For example, a blazed reflective diffraction grating is designed to have high efficiency for diffraction into a single order, for any polarization of light.

Methods have recently been developed for fabrication of a type of transmissive diffractive structure variously described in the literature by the terms diffractive waveplate, polarization grating, Pancharatnam phase device, Pancharatnam-Berry optical element, or geometric phase grating. Diffractive optical structures described by these terms have the property that diffraction of light results from the spatial modulation of the director axis in an anisotropic optical material. For our purposes, we will refer to such diffractive optical structures as diffractive waveplates.

An exceptional feature of diffractive waveplates, compared with other types of diffractive structures, is that the diffraction efficiency can be very high over a broad range of wavelengths, and essentially all of the diffracted light goes into a single diffraction order if the light incident on the diffractive waveplate is circularly polarized. However, the angle through which light is diffracted by some types of diffractive waveplates typically has different signs for the two circular polarizations of light. For example, if light of one circular polarization is diffracted to the left by such a diffractive waveplate, then light of the other circular polarization will be diffracted to the right by the same device. Similarly, for a diffractive waveplate structure designed as a lens, if the focal length of such a diffractive waveplate lens is positive for one circular polarization, then the focal length for the other circular polarization will be negative.

It is desirable in many applications of diffractive structures that dependence on the polarization of light be minimized. The fact that the direction through which light is diffracted by certain diffractive waveplate devices is different for the two circular polarizations of light prevents the use of such devices in many applications.

Thus, there is a need for diffractive waveplate structures that have the same effect on light regardless of the polarization of the light.

SUMMARY OF THE INVENTION

It is an object of the present invention to provide diffractive waveplate structures that have the same effect on light regardless of the polarization of the light.

Another object of the present invention is to provide a diffractive waveplate lens with high efficiency for any polarization of light, and for which the sign of the focal length is the same for both circular polarizations of light.

The key innovation of the present invention is the employment of specific optical axis orientation patterns in the diffractive waveplate structures. Simulations and measurements on prototype devices demonstrate that these devices, unlike diffractive waveplate devices of prior art, diffract light in the same direction regardless of the polarization of the light.

An embodiment of a polarization-independent high-efficiency diffractive optical film can include a first layer of an anisotropic material, meeting a half-wave retardation condition at a selected operating wavelength, wherein the orientation of the anisotropy axis varies in space, rotating both in the plane of the layer and around the axis perpendicular to the plane of the layer, a second layer of an anisotropic material, identical to the first layer in thickness and birefringence, parallel to the first layer, wherein the orientation of the anisotropy axis varies in space, rotating both in the plane of the layer and around the axis perpendicular to the plane of the layer, such that the rates of change with distance of the anisotropy axis orientation in both the plane of the layer and around the axis perpendicular to the layer are equal in magnitude but opposite in sign to the rates of change with distance of the anisotropy axis orientation of the first layer, the anisotropy axis varying linearly with distance in the direction perpendicular to the surface of the film within both the first layer and the second layer, the periods of rotation of the anisotropy axis both parallel to the surface of the film and perpendicular to the surface of the film being chosen such that light normally incident on the film satisfies a Bragg condition at said selected operating wavelength for both the first layer and the second layer.

The anisotropy axis orientation angle in the plane of the film can vary linearly with one Cartesian coordinate in this plane, thereby providing a beam steering function.

The anisotropy axis orientation angle in the plane of the film can vary as a quadratic function of the distance from a point in the plane, thereby forming a high-efficiency, polarization-independent diffractive optical spherical lens.

The anisotropy axis orientation angle in the plane of the film can vary as a quadratic function of one Cartesian coordinate in the plane, thereby forming a high-efficiency, polarization-independent diffractive optical cylindrical lens.

The anisotropy axis orientation angle in the plane of the film can vary as a linear function of a radial coordinate in the plane, thereby forming a high-efficiency, polarization-independent diffractive optical axicon.

The polarization-independent high-efficiency diffractive optical film can additionally include a third layer of an anisotropic material, meeting a half-wave retardation condition at the same selected operating wavelength as for the first and second layers, parallel to the first layer, wherein the orientation of the anisotropy axis varies in space, rotating both in the plane of the layer and around the axis perpendicular to the plane of the layer, a fourth layer of an anisotropic material, identical to the third layer in thickness and birefringence, parallel to the third layer, wherein the orientation of the anisotropy axis varies in space, rotating both in the plane of the layer and around the axis perpendicular to the plane of the layer, such that the rates of change with distance of the anisotropy axis orientation in both the plane of the layer and around the axis perpendicular to the layer are equal in magnitude but opposite in sign to the rates of change with distance of the anisotropy axis orientation of the third layer, the anisotropy axis varying linearly with distance in the direction perpendicular to the surface of the film within both the third layer and the fourth layer, the periods of rotation of the anisotropy axis both parallel to the surface of the film and perpendicular to the surface of the film chosen such that light diffracted from the first pair of layers and incident on the second pair of layers satisfies a Bragg condition at the same selected operating wavelength as for the first layer and the second layer.

The anisotropy axis orientation angle in the plane of the film can vary linearly in one Cartesian coordinate in this plane, thereby providing a polarization-independent beam steering function.

The anisotropy axis orientation angle in the plane of the film can vary as a quadratic function of the distance from a point in the plane, thereby forming a high-efficiency, polarization-independent diffractive optical spherical lens.

The anisotropy axis orientation angle in the plane of the film can vary as a quadratic function of one Cartesian coordinate in the plane, thereby forming a high-efficiency, polarization-independent diffractive optical cylindrical lens.

The anisotropy axis orientation angle in the plane of the film can vary as a linear function of a radial coordinate in the plane, thereby forming a high-efficiency, polarization-independent diffractive optical axicon.

Another embodiment of a polarization-independent high-efficiency diffractive optical film can include a first layer of an anisotropic material, meeting a half-wave retardation condition at a selected operating wavelength, wherein the orientation of the anisotropy axis varies in space, rotating in the plane of the layer, a second layer of an anisotropic material, identical to the first layer in thickness and birefringence, parallel to the first layer, wherein the orientation of the anisotropy axis varies in space, rotating in the plane of the layer, such that the rate of change with distance of the anisotropy axis orientation in the plane of the layer is equal in magnitude but opposite in sign to the rate of change with distance of the anisotropy axis orientation of the third layer, the period of rotation of the anisotropy axis parallel to the surface of the film being chosen such that light at a selected angle of incidence on the film satisfies a Bragg condition at a selected operating wavelength for both the first layer and the second layer.

The anisotropy axis orientation angle in the plane of the film can vary linearly in one Cartesian coordinate in this plane, thereby providing a polarization-independent beam steering function.

Further objects and advantages of this invention will be apparent from the following detailed description of the presently preferred embodiments which are illustrated schematically in the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 16A illustrates the focusing of both LHCP and RHCP light to the same focal point by a diffractive waveplate lens with a structure that includes all four of the PVG configurations shown in FIG. 9.

FIG. 16B illustrates the results of calculations of the efficiency with which unpolarized light is brought to a focus by three different types of diffractive structure, namely (1) a diffractive waveplate lens, (2) a one-level PVG lens, and (3) a four-level PVG lens.

DETAILED DESCRIPTION OF THE INVENTION

Figure 1:
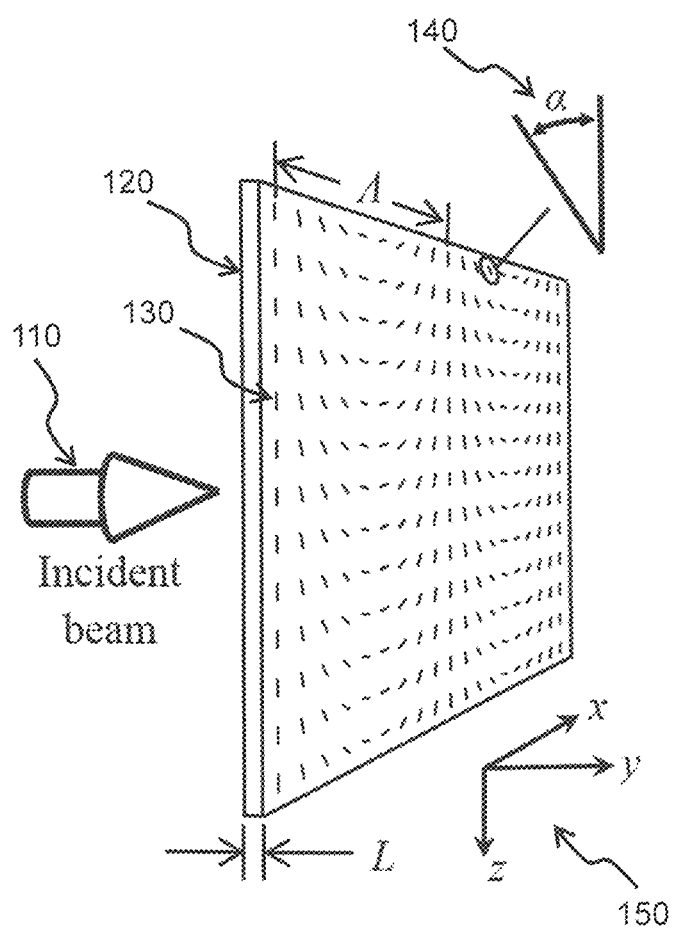
FIG. 1 illustrates the optical axis pattern of a cycloidal diffractive waveplate (CDW).

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary of the Invention above and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A listing of components will now be described:
110 Optical beam
120 Diffractive waveplate structure
130 Short line segments representing local orientation of optical axis
140 Optical axis orientation angle $\alpha$ 150 Coordinate system used in describing diffractive waveplate structure
210 Coordinate system used to describe structure of CDW 230
220 Line illustrating direction of propagation of incident beam
230 Cycloidal diffractive waveplate (CDW)
240 Short line segment illustrating the location of a plane of constant optical axis orientation
250 Line illustrating the direction of propagation of that portion of the incident beam that is not diffracted by the CDW
260 Line segment illustrating the direction of propagation of the +1 diffracted order
270 Line segment illustrating the direction of propagation of the −1 diffracted order
215 Coordinate system used to describe structure of CDW 235
225 Line illustrating direction of propagation of incident beam
235 Cycloidal diffractive waveplate (CDW)
245 Short line segment illustrating the location of a plane of constant optical axis orientation
255 Line illustrating the direction of propagation of that portion of the incident beam that is not diffracted by the CDW
265 Line segment illustrating the direction of propagation of the +1 diffracted order
275 Line segment illustrating the direction of propagation of the −1 diffracted order
1010 Coordinate system used to describe structure of PVG 1030
1020 Line illustrating direction of propagation of incident beam
1030 Polarization volume grating (PVG)
1040 Short line segment illustrating the location of a plane of constant optical axis orientation
1050 Line illustrating the direction of propagation of that portion of the incident beam that is not diffracted by the PVG
1060 Line segment illustrating the direction of propagation of the +1 diffracted order
1070 Line segment illustrating the direction of propagation of the −1 diffracted order
1015 Coordinate system used to describe structure of PVG 1035
1025 Line illustrating direction of propagation of incident beam
1035 Polarization volume grating (PVG)
1045 Short line segment illustrating the location of a plane of constant optical axis orientation
1055 Line illustrating the direction of propagation of that portion of the incident beam that is not diffracted by the PVG
1065 Line segment illustrating the direction of propagation of the +1 diffracted order
1075 Line segment illustrating the direction of propagation of the −1 diffracted order
1205 Short line segment illustrating the location of a plane of constant optical axis orientation in a PVG
1210 Line illustrating direction of propagation of incident beam
1215 Line segment illustrating the direction of propagation of the output beam from the PVG with the highest power Thin-film diffractive waveplates (DWs), also referred to as polarization gratings, optical axis gratings, Pancharatnam phase devices, Pancharatnam-Berry optical elements, or geometric phase gratings, with various types of spatial modulation of the optical axis orientation, are well known, and reliable methods of fabrication of such optical devices are now available. The fabrication technology is especially advanced for DWs with variation of the orientation of the optical axis of the anisotropic material comprising the DW along a single Cartesian coordinate in the plane of the DW. DWs of this type are known as cycloidal diffractive waveplates (CDWs).

The optical axis orientation in a conventional CDW is independent on the spatial coordinate in the direction perpendicular to the plane of the CDW. Recently, it was shown that diffraction efficiencies approaching approximately 100% for polarized light can be achieved when the incident and diffracted beams meet the Bragg condition for polarization volume gratings (PVGs), structures similar to CDWs but with an axial dependence of the optical axis orientation. In the present work, we extend these results to show both analytically and experimentally that both the magnitude and the sign of the angle of diffraction is independent of the polarization of the incident light for certain two-layer PVG structures, and for angles meeting the Bragg condition. This is in contrast to the polarization dependence of the sign of the diffraction angle for conventional CDWs.

In addition to demonstrating that polarization-independent diffraction is possible with two level PVG structures, we also show here, again both analytically and experimentally, that polarization-independent diffraction is also possible for two level CDW structures when the Bragg condition is met.

For all the simulation and experiments reported here, the diffraction efficiency is maximized by setting the thickness of the grating L such that it satisfies the half-wave phase retardation condition $L\Delta n = \lambda/2$ at a particular wavelength of operation, where $\Delta n$ is the birefringence of the material, and $\lambda$ is the wavelength in vacuum. The simulations reported here assume that the material comprising the CDW and PVG gratings is a current state-of-the-art liquid crystal polymer (LCP) with $\Delta n$=approximately 0.15, and with extraordinary and ordinary refractive indices $n_e$=approximately 1.69, $n_o$=approximately 1.54, respectively, at the specific wavelength $\lambda$=approximately 633 nm. By definition, $\Delta n = (n_e - n_o)$. These parameters, together with the half-wave retardation condition, imply a grating thickness L=approximately 2.11 µm.

These specific parameter values are employed here for illustration only. The simulation methods and experimental results disclosed herein can be applied to a wide range of wavelengths, and to both currently available and prospective anisotropic materials. To emphasize the applicability of the results disclosed herein to a wide range of wavelengths, we have in some cases presented diffraction efficiency as a function of the ratio of grating period $\Lambda$ to wavelength $\lambda$, although these results are exact for all wavelengths only for the specific values of $\Delta n$, $n_e$, and $n_o$ given above. It is assumed that for wavelengths other than $\lambda$=approximately 633 nm, the thickness L of the grating is adjusted to be consistent with the half-wave retardation condition. To minimize effects of Fresnel reflection in our modeling and simulation, we assume that the CDW or PVG is immersed into a dielectric medium with spatially uniform, isotropic refractive index equal to the root mean square index of the birefringent medium comprising the CDW or PVG:

$$n_{rms} = \sqrt{(n_e^2 + 2n_o^2)/3} \tag{1}$$

As a consequence, the power of the reflected beams was found to be less than approximately 1% of the input power in all simulations, and such reflected beams are neglected here. Because diffraction efficiencies were calculated for CDWs and PVGs immersed in this matching medium, the diffracted light would suffer total internal reflection in some cases if it were incident on an interface between the matching medium and vacuum. The light incident on the grating is assumed to be a monochromatic plane wave of either left- or right-hand circular polarization (LHCP or RHCP) with propagation vector in the x-y plane, as shown in FIG. 1. The electromagnetic field propagation through CDWs and PVGs was modelled using the COMSOL Multiphysics software package. For the values of $n_e$ and $n_o$ given above, Eq. (1) results in $n_{rms}$=approximately 1.59, a value that will be used throughout this work.

In FIG. 1, an optical beam 110 is incident on a diffractive waveplate structure 120, which consists of a spatially patterned birefringent medium with optical axis orientation as a function of position indicated by short line segments 130. The optical axis orientation angle α shown at 140 varies linearly along the x axis for the particular structure shown. A coordinate system 150 will be used in subsequent discussions of this type of structure. The type of diffractive waveplate illustrated in FIG. 1 is referred to as a cycloidal diffractive waveplate (CDW). This type of diffractive waveplate structure has a prismatic effect on an incident beam of light, in that it turns the beam through a fixed angle in the same way that a refractive prism turns a monochromatic beam through a fixed angle. Such cycloidal diffractive waveplate (CDW) structures and systems are shown and described in U.S. Pat. No. 9,658,512 to Tabirian et al., and U.S. Pat. No. 10,185,182 to Tabirian, which are both assigned to the same assignee as the subject patent application, and both of which patents are incorporated herein by reference in their entirety.

The optical axis whose orientation angle is shown at 140 in FIG. 1 is a vector pointed along that direction in which the index of refraction is $n_e$. This axis may also be referred to as the anisotropy axis.

Simulation of Cycloidal Diffractive Waveplates

CDWs are characterized by periodic distribution of orientation of optical anisotropy axis n:

$$n(x) = [\cos \alpha(x), \sin \alpha(x), 0], \alpha(x) = \frac{\pi}{\Lambda} x \quad (2)$$

where n(x) is a unit vector pointing in the direction of the extraordinary axis of the local birefringent medium, α(x) is the local azimuthal angle of the optical axis director vector, and Λ is the period of the grating. This structure is one-dimensional with the optical axis orientation dependent only on coordinate x, as shown in FIG. 1. For liquid crystals and liquid crystal polymers, the vector n represents the director axis of the molecular orientation.

For some of our modeling and experiments, the angle θ between the direction of propagation of incident light in the matching medium and the normal to the waveplate plane corresponds to the Bragg condition for the first-order diffraction from the planes of constant orientation of the director vector n:

$$2n_{rms} \Lambda \sin \theta = \lambda \quad (3)$$

Prior to the entry of light into the matching medium, the angle θ' between the direction of propagation of the incident light in vacuum and the normal to the grating, for a wave meeting the Bragg condition for reflection from the grating, is given by the following equation:

$$2\Lambda \sin \theta' = \lambda \quad (4)$$

Equations (3) and (4) are equivalent provided that the interface between the matching medium and vacuum is a plane parallel to the CDW, as we will assume here.

Figure 2A:
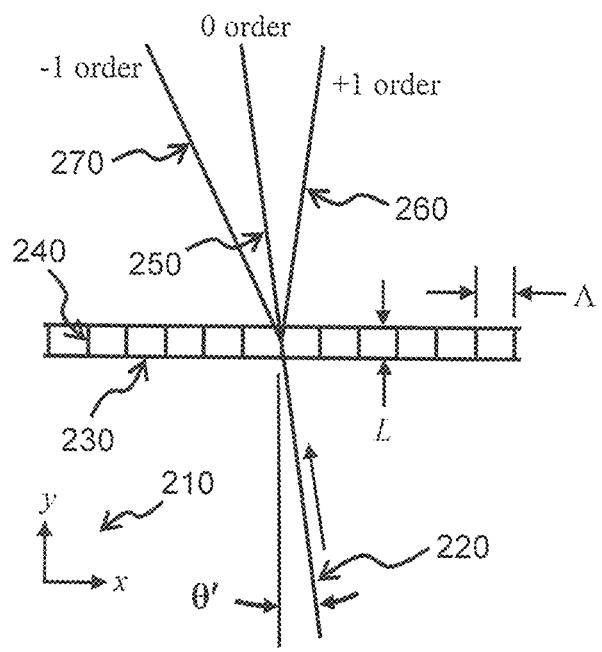
FIG. 2A illustrates a prior art view showing the three beams diffracted by a CDW when the diffraction occurs at the Bragg angle.
Figure 2B:
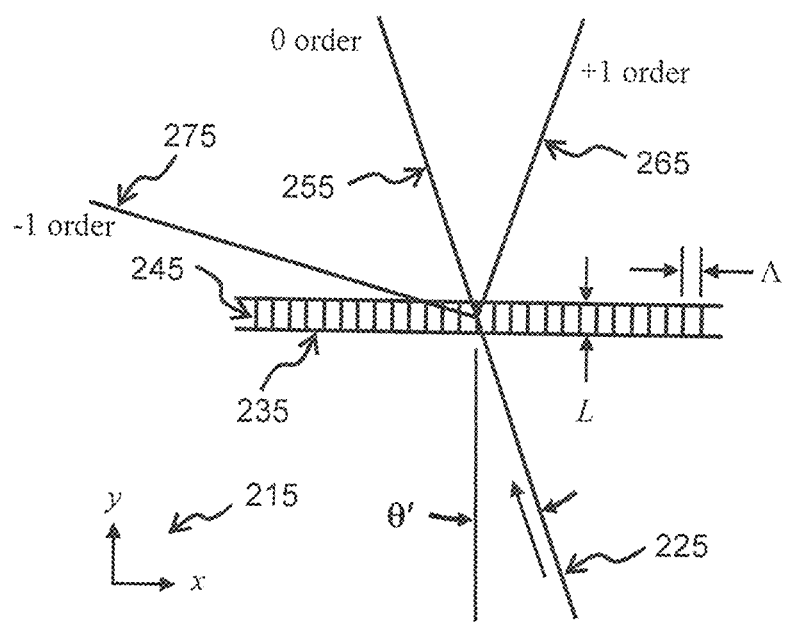
FIG. 2B illustrates a prior art view of the three beams diffracted by a CDW when the diffraction occurs at the Bragg angle for an angle of incidence larger than for the case shown in FIG. 2A.

The lowest orders of diffraction from a CDW are illustrated in FIG. 2 for two values of the grating period Λ, and for a vacuum wavelength of 633 nm. The same coordinate system 210 as was used in FIG. 1 is also useful in understanding FIG. 2. The coordinate system 150 in FIG. 1 has the same relationship with CDW 120 in FIG. 1 as the coordinate systems 210 and 215 in FIG. 2 have to CDWs 230 and 235 in FIG. 2. For the order of diffraction labeled +1 in FIG. 2, the angle of incidence meets the Bragg condition of Eqs. (3) and (4). In FIG. 2A, optical beam 220 is incident at an angle θ' onto the CDW 230. The short vertical line segments 240 in FIG. 2A represent planes of constant optical axis orientation. A portion of the beam 250 is transmitted through the CDW without being deflected, and two additional portions 260 and 270 are diffracted out of the incident beam. FIG. 2A illustrates diffraction for the case in which the grating period is Λ=approximately 2440 nm and the angle of incidence in vacuum is θ'=approximately 7.5°, and FIG. 2B illustrates diffraction for the case in which the grating period is Λ=approximately 1055 nm and the angle of incidence in vacuum is θ'=approximately 17.5°. In FIG. 2B, the coordinate system is indicated at 215, the incident beam at 225, the CDW at 235, the planes of constant optical axis orientation at 245, the portion of the incident beam that is not diffracted at 255, and the two diffracted orders at 265 and 275.

In both FIG. 2A and FIG. 2B, the angle of incidence in vacuum θ' meets the Bragg condition of Eq. (4). Because the grating period is shorter for the case illustrated in FIG. 2B than for the case illustrated in FIG. 2A, the angle of incidence θ' must be larger for the case illustrated in FIG. 2B than for the case illustrated in FIG. 2A in order for the Bragg condition of Eq. (4) to be met. FIG. 2A and FIG. 2B represent two special cases of the incidence of a monochromatic plane wave of electromagnetic radiation on a CDW, with an angle of incidence satisfying the Bragg condition. In general, for any angle of incidence θ', a grating period Λ can be found such that the Bragg condition of Eq. (4) is satisfied.

Figure 3A:
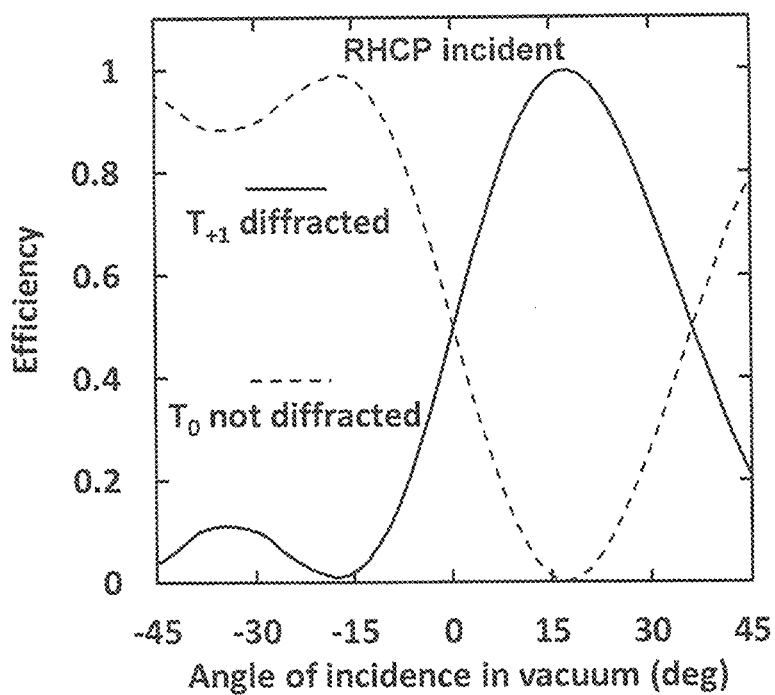
FIG. 3A illustrates the results of calculations of the efficiency with which light is diffracted or not diffracted as a function of the angle of incidence of a plane wave on a CDW, for wavelength $\lambda$=approximately 633 nm and CDW period $\Lambda$=approximately 1055 nm, and for right-hand circular polarization (RHCP) incident light.
Figure 3B:
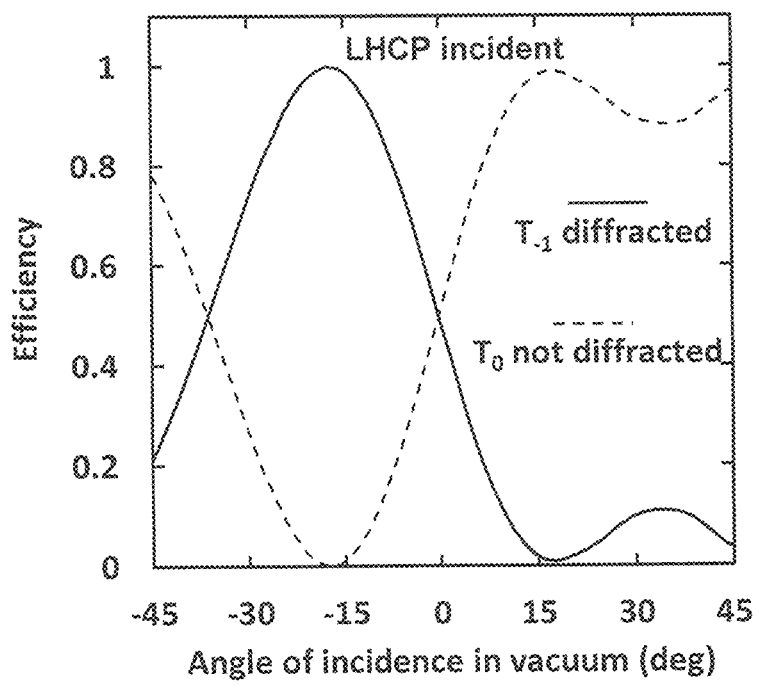
FIG. 3B illustrates the results of calculations of the efficiency with which light is diffracted or not diffracted as a function of the angle of incidence of a plane wave on a CDW, for wavelength $\lambda$=approximately 633 nm and CDW period $\Lambda$=approximately 1055 nm, and for left-hand circular polarization (LHCP) incident light.

FIG. 3 illustrates the results of calculation of the efficiency with which light is diffracted or not diffracted at a wavelength of approximately 633 nm, for a CDW with a period of Λ=approximately 1055 nm, and with the spatial dependence of optical axis orientation as indicated in Eq. (2). FIG. 3A is for the case in which the incident light is RHCP, and FIG. 3B is for the case in which the incident light is LHCP. It is notable that the maximum efficiency for the $T_{+1}$ diffracted order for RHCP light (FIG. 3A) occurs at the same angle of incidence at which the minimum efficiency for the $T_{-1}$ diffracted order occurs for LHCP (FIG. 3B). This occurs only for the selected period of Λ=approximately 1055 nm.

Experimental

Figure 4:
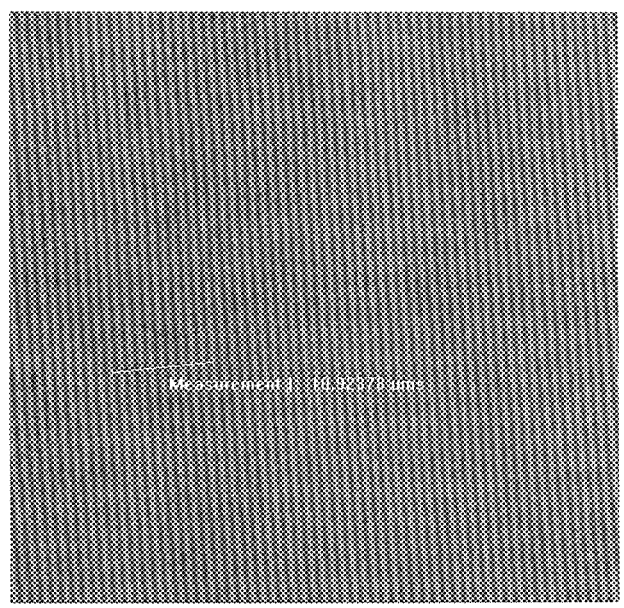
FIG. 4 is a photomicrograph of a CDW for which the results of efficiency calculations are shown in FIG. 3A and FIG. 3B.
Figure 5:
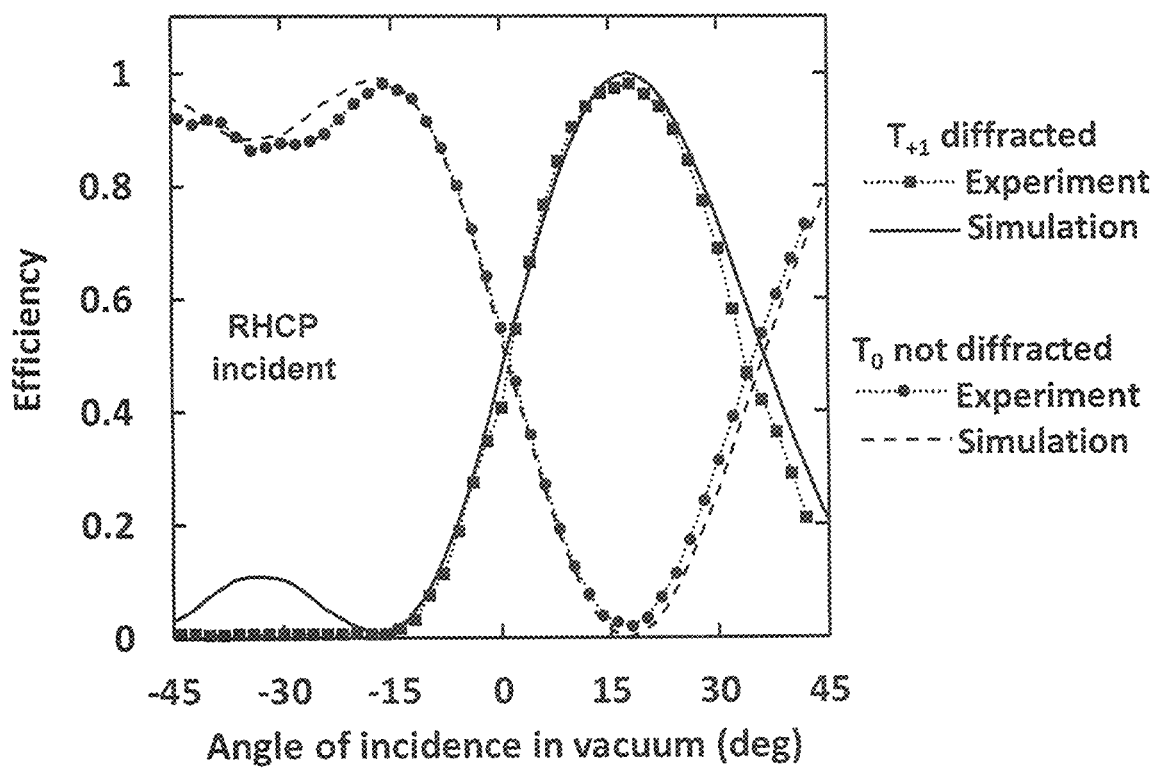
FIG. 5 shows a comparison of the measured efficiency and the efficiency predicted by simulation with which light of RHCP polarization is diffracted or not diffracted by the CDW of which a photomicrograph is shown in FIG. 4.

To test the simulation results illustrated in FIG. 3, we recorded a CDW using liquid crystal polymer with the same refractive indices as in our simulation, and with a grating period of Λ=approximately 1097 nm, i.e. close to the ideal period of 1055 nm noted above. By means of examination with a polarizing microscope, the period of the recorded CDW was verified to be approximately 1097 nm, as illustrated in FIG. 4. Separate measurements with a spectrometer demonstrated that the combination of birefringence and thickness resulted in (approximately 0.50±approximately 0.01) waves of optical retardation at the approximately 633 nm test wavelength. The diffraction efficiency of this CDW as a function of angle for RHCP light was measured at a wavelength of approximately 633 nm at a series of angles separated by approximately 2° increments. Measurement results are in good agreement with the corresponding simulation, as illustrated in FIG. 5. Peak measured diffraction efficiency for the +1 order is approximately 98% at approximately 18° incidence angle in vacuum (FIG. 5). The experimental angle in air of peak diffraction efficiency ($\theta'$=approximately 18°) agrees with the simulated one ($\theta'$=approximately) 16.8° within the measurement error.

The demonstrated property of such CDWs to selectively transmit or diffract light of certain polarizations for exactly opposite positive and negative angles makes it possible to create a polarization-independent diffractive element by means of combining two CDWs such that the rate of change along axis x of the optical axis orientation angle α shown at 140 in FIG. 1 has the same magnitude, but opposite sign, for the two gratings. Specifically, if the optical axis director of the first grating as a function of position is given by Eq. (2), then the optical axis director angle for the second grating is as follows:

$$n(x) = [\cos \alpha(x), -\sin \alpha(x), 0], \alpha(x) = \frac{\pi}{\Lambda} x \quad (5)$$

Figure 6A:
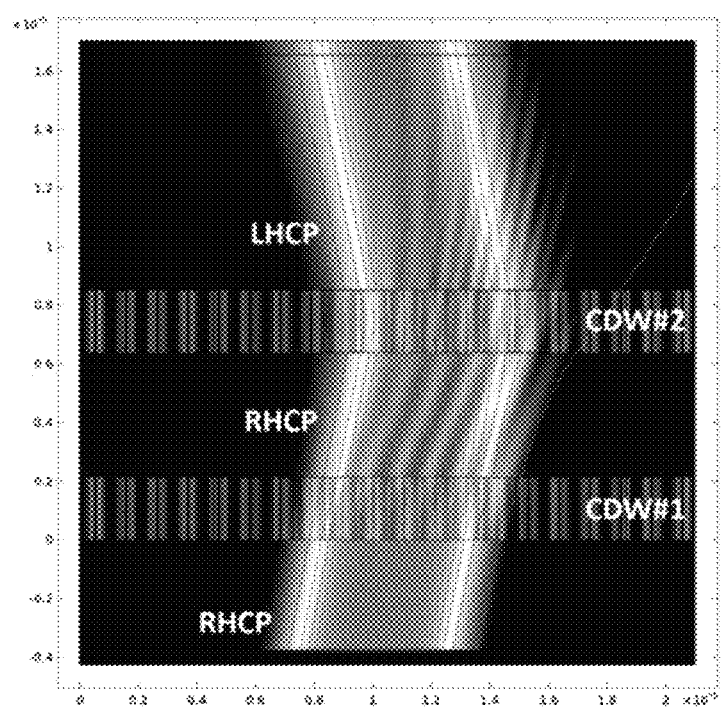
FIG. 6A illustrates the results of calculations of the diffraction of a beam of light with right-hand circular polarization (RHCP) by a pair of CDWs, with the incident light propagating up and to the right in the view shown in the figure, and propagating up and to the left after passing through the two CDWs.
Figure 6B:
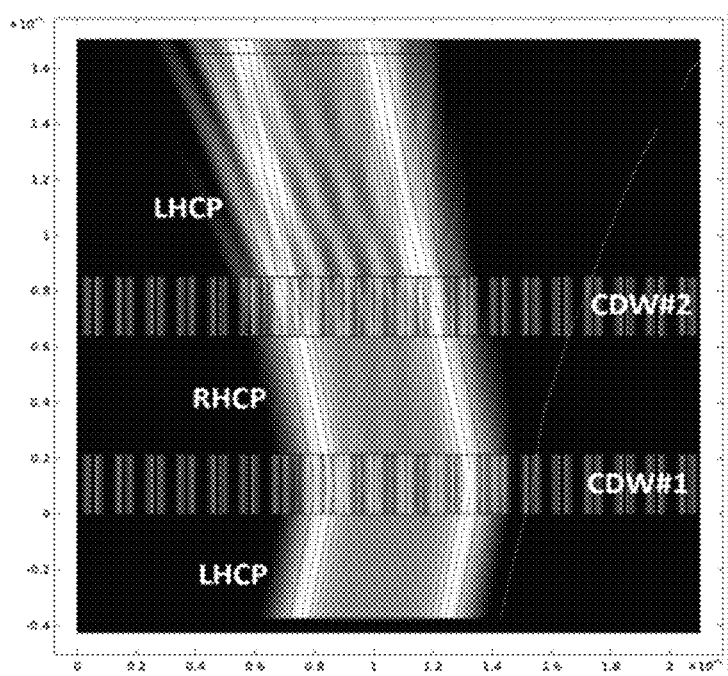
FIG. 6B illustrates the results of calculations of the diffraction of a beam of LHCP light by a pair of CDWs, with the incident light propagating up and to the right in the view shown in the figure, and propagating up and to the left after passing through the two CDWs.
Figure 6C:
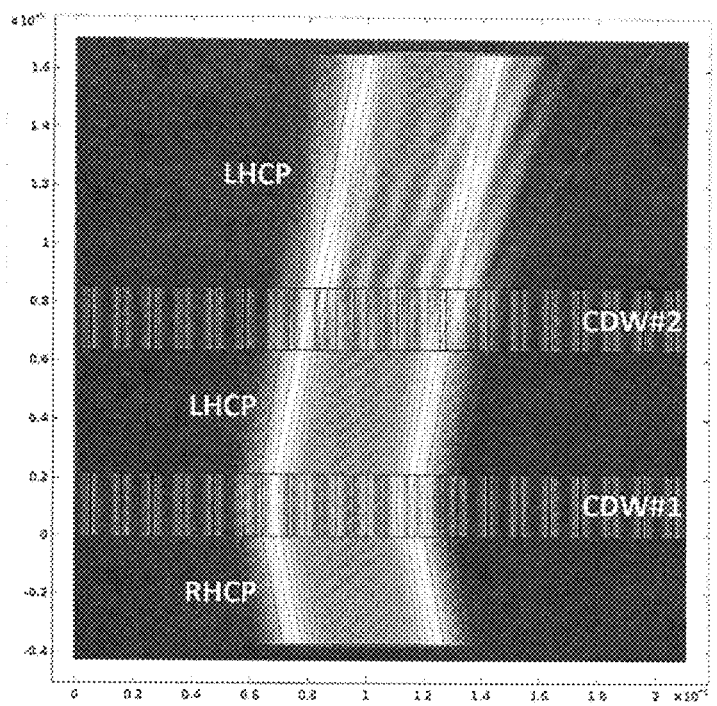
FIG. 6C illustrates the results of calculations of the diffraction of a beam of RHCP light by a pair of CDWs, with the incident light propagating up and to the left in the view shown in the figure, and propagating up and to the right after passing through the two CDWs.
Figure 6D:
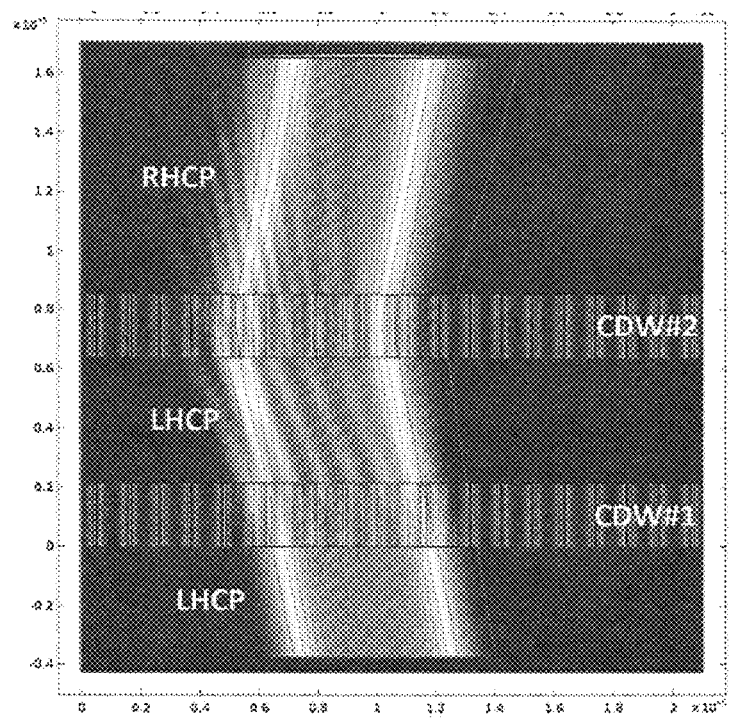
FIG. 6D illustrates the results of calculations of the diffraction of a beam of LHCP light by a pair of CDWs, with the incident light propagating up and to the left in the view shown in the figure, and propagating up and to the right after passing through the two CDWs.

In practical terms, the two gratings are identical, except that the second one is rotated by 180° about either the x or y axis in FIG. 1 with respect to the first one. When put together, each grating diffracts light of only one circular polarization while transmitting light of the opposite circular polarization at the optimal angle $\theta'$=approximately 17.5° in vacuum for gratings with a period of approximately 1055 nm, equivalent to θ=approximately 10.9° in the matching medium. Such a pair of CDWs constitutes a polarization-independent diffractive element. The result of simulating the propagation of small diameter, collimated laser RHCP and LHCP beams through such a grating pair is illustrated in FIG. 6. In FIG. 6, the spatial dependence of the optical axis orientation is given by Eq. (2) for CDW #1, and by Eq. (5) for CDW #2. FIG. 6A shows the result of modeling the propagation of an RHCP beam incident at an angle of − approximately 17.5° in vacuum on the pair of CDWs. FIG. 6B shows the result of modeling the propagation of an LHCP beam incident at an angle of − approximately 17.5° in vacuum on the pair of CDWs. FIG. 6C shows the result of modeling the propagation of an RHCP beam incident at an angle of + approximately 17.5° in vacuum on the pair of CDWs. FIG. 6D shows the result of modeling the propagation of an LHCP beam incident at an angle of $\theta'$=+ approximately 17.5° in vacuum on the pair of CDWs. The normalized electric field shown as various shades of grey in FIG. 6 and in some later figures is defined as the normalized mean squared value of the electric field averaged over one temporal cycle.

Figure 7A:
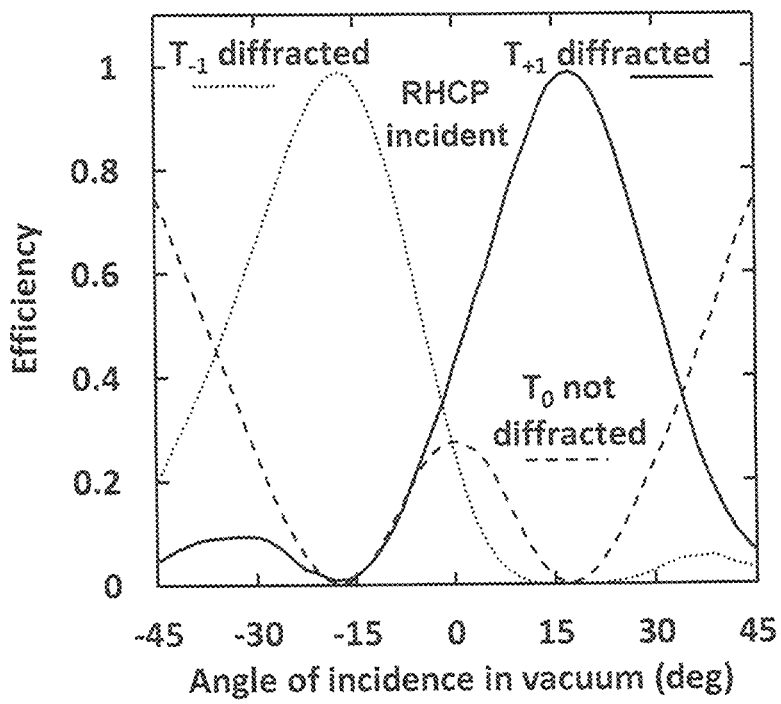
FIG. 7A illustrates the results of calculations of the efficiency with which RHCP light is diffracted or not diffracted from a pair of CDWs, as a function of the angle of incidence of the light.
Figure 7B:
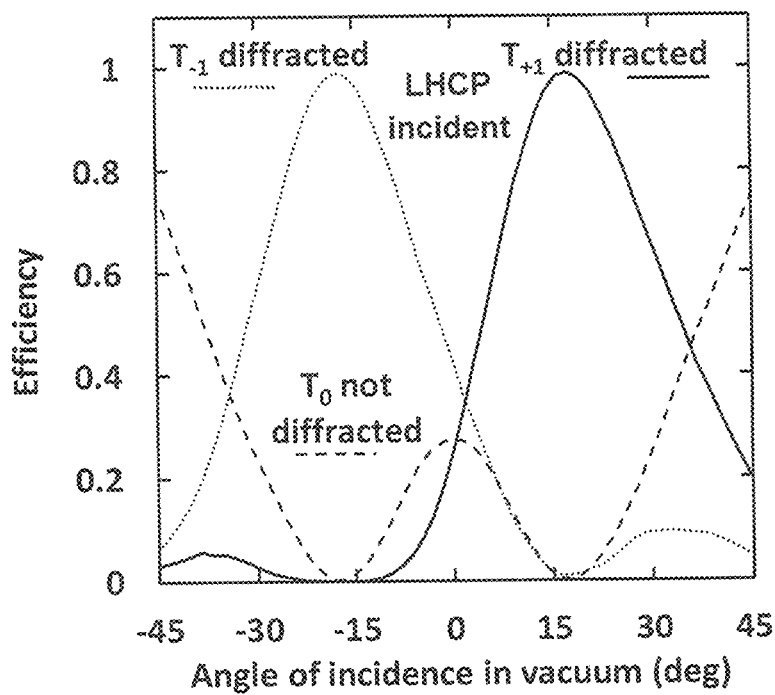
FIG. 7B illustrates the results of calculations of the efficiency with which LHCP light is diffracted or not diffracted from a pair of CDWs, as a function of the angle of incidence of the light.

FIG. 7 illustrates the predicted diffraction efficiency as a function of angle of incidence for light at a wavelength of approximately 633 nm on the pair of CDWs illustrated in FIG. 6. The calculated diffraction efficiency into the +1, 0, and −1 orders is shown for RHCP light in FIG. 7A, and LHCP light in FIG. 7B. FIG. 7 shows that essentially all of the light of either polarization is diffracted into the +1 order for an angle of incidence in vacuum of $\theta'$=+ approximately 17.5°, and essentially all of the light of either polarization is diffracted into the −1 order for an angle of incidence in vacuum of $\theta'$=−approximately 17.5°. As shown in FIG. 7, our simulation predicts a maximum diffraction efficiency for unpolarized light of approximately 98.9%. As is well known, the highest possible diffraction efficiency by a single CDW for unpolarized light into a given order is approximately 50% because light of the two circular polarizations is diffracted in opposite directions.

Figure 8:
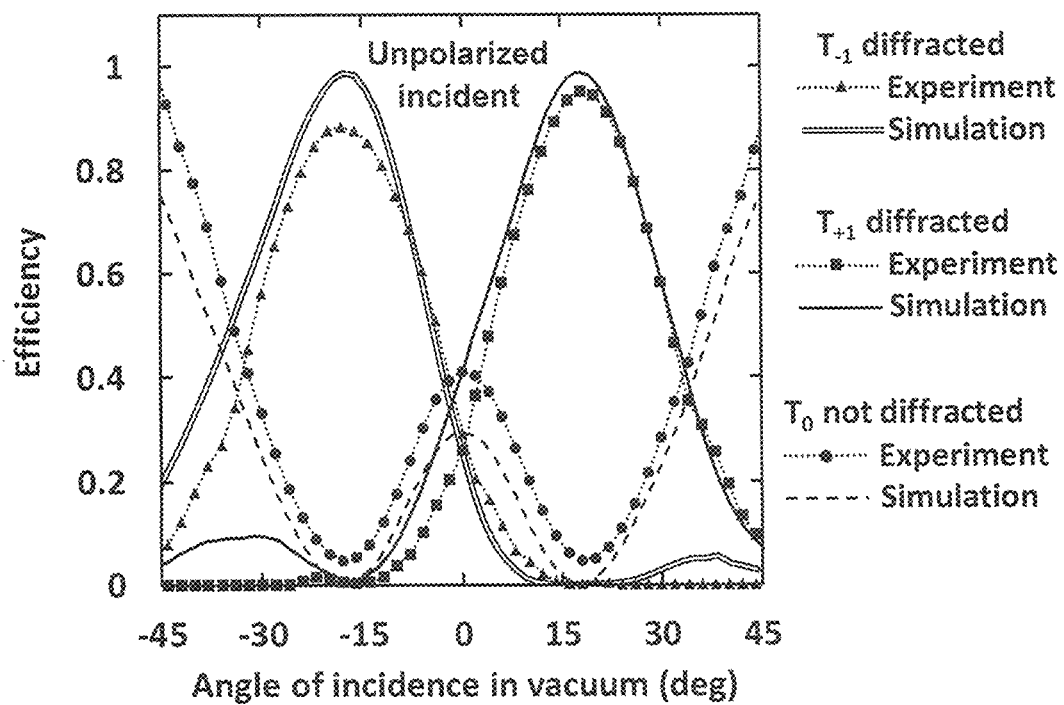
FIG. 8 illustrates a comparison of the experimentally measured and calculated efficiency with which unpolarized light is diffracted or not diffracted from a pair of CDWs, as a function of the angle of incidence of the light onto the CDWs.

A comparison of experimental measurements of diffraction efficiency with simulation results for unpolarized light for a pair of CDWs, both having a grating period of Λ=approximately 1097 nm, is shown in FIG. 8. For unpolarized light, the maximum diffraction efficiency into the +1st diffraction order was measured to be approximately 95% at an incidence angle of + approximately 18° in vacuum, while for the −1st order it was approximately 88% for − approximately 18°. The discrepancy between experiment and simulation is likely due to slight deviation of optical retardation from the half-wave condition in the recorded CDWs.

Simulation of Polarization Volume Gratings

Polarization volume gratings (PVGs) are characterized by a two-dimensional periodic distribution of optical axis orientation:

$$n(x,y)=[\cos \alpha(x,y), \sin \alpha(x,y), 0] \quad (6)$$

where $$\alpha(x, y) = H \frac{\pi}{\Lambda_x} x + V \frac{\pi}{\Lambda_y} y \quad (7)$$

Here $\partial_x$ and $\Lambda_y$ are grating periods along x- and y-axes while H=±1 and V=±1 define the director rotation directions along the two axes. There are four possible combinations of horizontal and vertical rotations of the director defined by the signs of H and V in Eq. (7).

Figure 9:
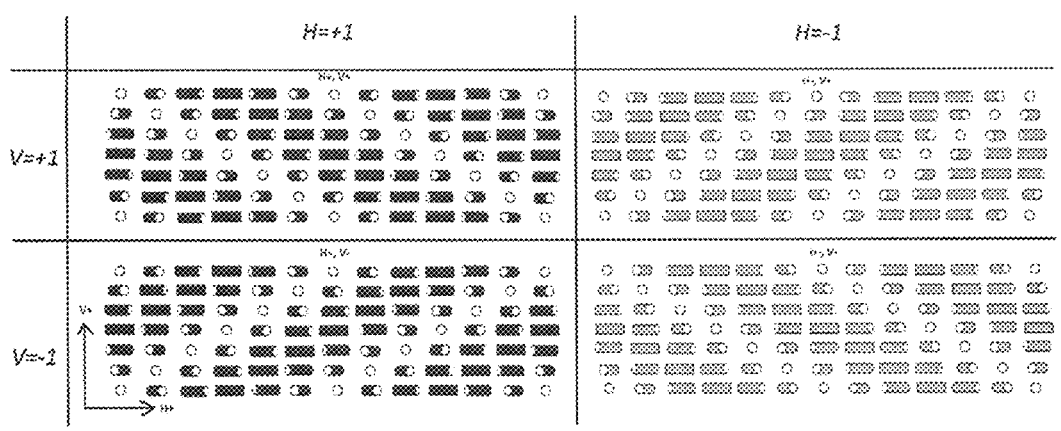
FIG. 9 illustrated the four possible spatial patterns of optical director orientations in polarization volume gratings (PVGs).

As one moves in the positive direction along x-axis, H=+1 and H=−1 correspond to counter-clockwise and clockwise director rotations, respectively. Similarly, if one moves along the positive direction of the y-axis, V=+1 and V=−1 correspond to counter-clockwise and clockwise rotations, respectively. The four possible combinations of rotations, H+V+, H+V−, H−V+, H−V−, are shown in FIG. 9.

Figure 10A:
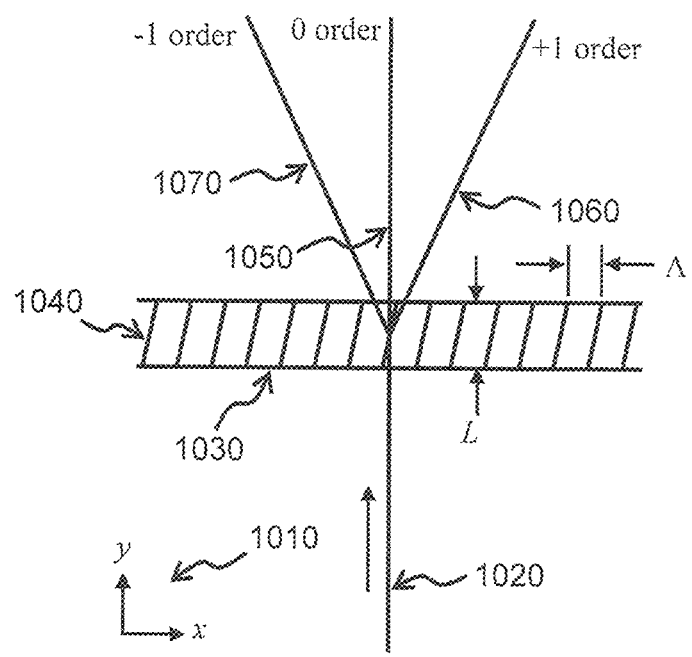
FIG. 10A illustrates a prior art view of the directions of propagation of light diffracted from a PVG, with light normally incident on the PVG, with diffraction at the Bragg angle for the +1 order of diffraction, for wavelength $\lambda$=approximately 633 nm and PVG period $\Lambda$=approximately 1014 nm in a direction parallel to the surface of the PVG.
Figure 10B:
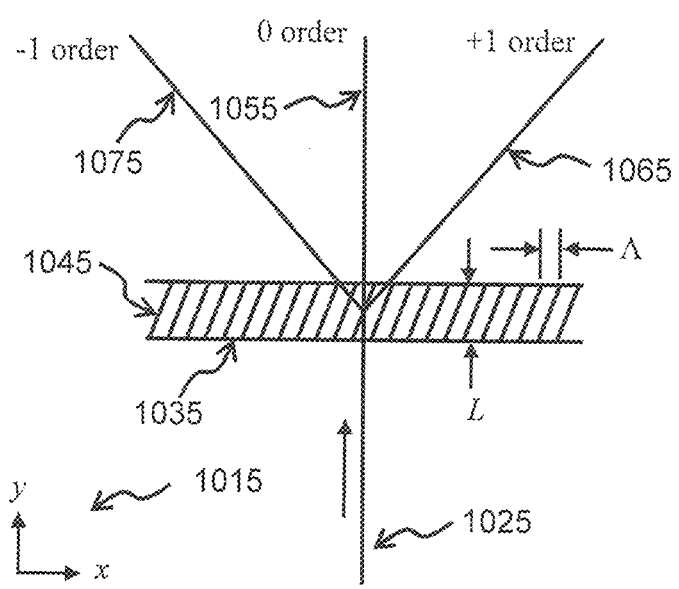
FIG. 10B illustrates a prior art view of the directions of propagation of light diffracted from a PVG, with light normally incident on the PVG, with diffraction at the Bragg angle for the +1 order of diffraction, for wavelength $\lambda$=approximately 633 nm and PVG period $\Lambda$=approximately 633 nm in a direction parallel to the surface of the PVG.

The lowest orders of diffraction from a PVG are illustrated in FIG. 10 for two values of the grating period Λ, for a vacuum wavelength of approximately 633 nm, and for normal incidence. The short slanted line segments 1040 and 1045 in FIG. 10 represent planes of constant optical axis orientation. FIG. 10A illustrates diffraction for the case in which the grating period is Λ=approximately 1014 nm, and FIG. 10B illustrates diffraction for the case in which the grating period is Λ=approximately 633 nm.

In FIG. 10A, the coordinate system is indicated at 1010, the incident beam at 1020, the PVG at 1030, the planes of constant optical axis orientation at 1040, the portion of the incident beam that is not diffracted at 1050, and the two diffracted orders at 1060 and 1070.

In FIG. 10B, the coordinate system is indicated at 1015, the incident beam at 1025, the PVG at 1035, the planes of constant optical axis orientation at 1045, the portion of the incident beam that is not diffracted at 1055, and the two diffracted orders at 1065 and 1075.

All four of the PVG structures illustrated in FIG. 9 are somewhat similar so we expect them to manifest somewhat symmetrical properties with respect to diffraction of light. Due to the symmetry, it is sufficient to study the diffraction properties of only one type of PVG to deduce the characteristics of all others for circularly polarized light. We consider the H+V+ type of PVG recorded in LCP with the same values of refractive indices as in the above analysis of CDWs, namely $n_e$=approximately 1.69, $n_o$=approximately 1.54, $\Delta n$=approximately 0.15. The operation wavelength is again assumed to be $\lambda$=approximately 633 nm in vacuum and the thickness L of each PVG again satisfies the half-wave phase retardation condition.

For normal incidence, the Bragg diffraction condition for the first diffraction order in PVGs can be expressed as:

$$\beta = 2\tan^{-1}\left(\frac{\Lambda_x}{\Lambda_y}\right) = \sin^{-1}\left(\frac{\lambda}{n_{rms}\Lambda_x}\right) \quad (8a)$$

$$\beta' = \sin^{-1}\left(\frac{\lambda}{\Lambda_x}\right) \quad (8b)$$

Figure 11A:
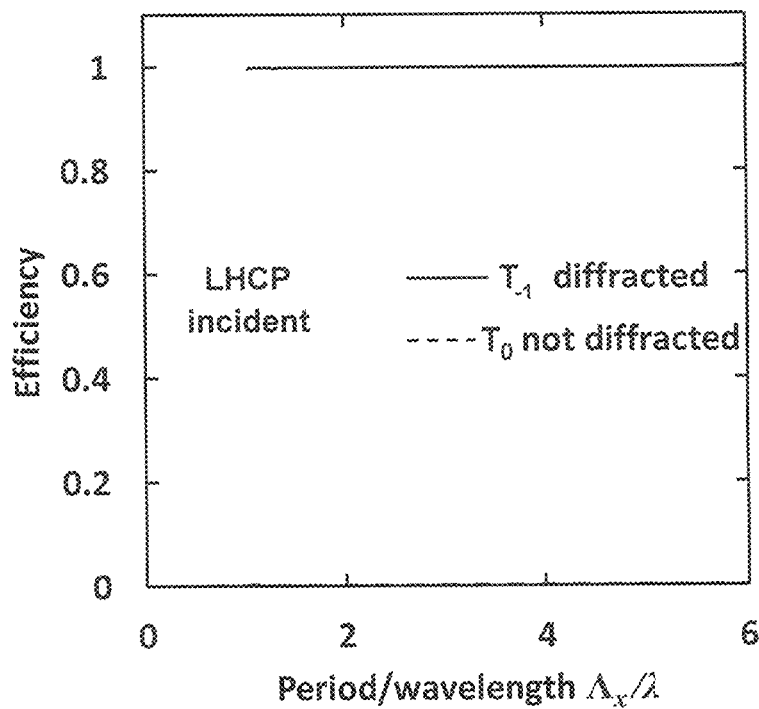
FIG. 11A illustrates the results of calculations of the efficiency with which light is diffracted or not diffracted from a PVG of the type labeled H+V+ in FIG. 9, as a function of the ratio of the wavelength $\lambda$ to the period $\Lambda$, for LHCP light normally incident on the PVG, with −1 order diffracting at the Bragg angle.

Here $\beta$ and $\beta'$ are the angles through which light is diffracted in the matching medium and in vacuum, respectively. Simulated diffraction efficiency of an H+V+ PVG as a function of the ratio of the period $\Lambda_x$ to wavelength $\lambda$ for normally incident LHCP light is shown in FIG. 11A, and for RHCP in FIG. 11B. For each value of $\Lambda_x$ in FIG. 11, the period $\Lambda_y$ was adjusted such that the Bragg diffraction condition [Eq. (8)] was met. According to FIG. 11A, all of the incident LHCP light is diffracted into the −1 order when the Bragg condition is fulfilled.

For a PVG having the characteristics described by $n_{rms}$, $\Lambda_x$, and $\Lambda_y$, the wavelength satisfying Eq. (8a) will be referred to as the selected operating wavelength. For this wavelength, a normally-incident light beam will be diffracted at the Bragg angle.

Figure 11B:
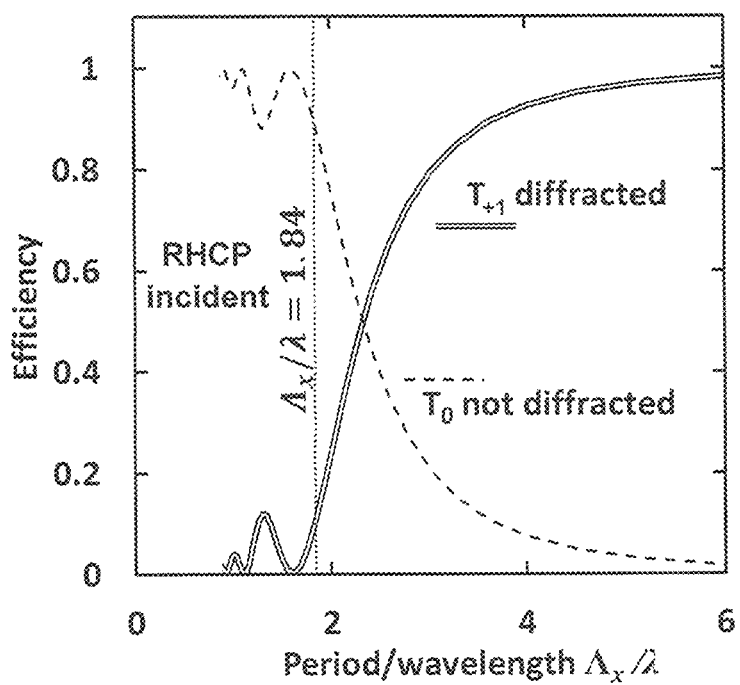
FIG. 11B illustrates the results of calculations of the efficiency with which light is diffracted or not diffracted from a PVG of the type labeled H+V+ in FIG. 9, as a function of the ratio of the wavelength $\lambda$ to the period $\Lambda$, for RHCP light normally incident on the PVG, with −1 order diffracting at the Bragg angle.

We further found that there is a range of periods $\Lambda_x/\lambda$≤approximately 1.84 for which RHCP light is almost completely (>approximately 90%) transmitted into the zero order, as shown in FIG. 11B, while LHCP is completely diffracted into the −1 order, as shown in FIG. 11A. We have limited the calculations here to periods $\Lambda_x/\lambda$>1 since diffraction from gratings with $\Lambda_x$<$\lambda$ would suffer total internal reflection at the interface between the matching medium and air. The condition of interest here of 100% diffraction efficiency for one circular polarization and near zero diffraction efficiency for the other circular polarization is therefore 1<$\Lambda_x/\lambda$<approximately 1.84, which according to Eq. (8) corresponds to diffraction angles between $\theta$=approximately 20.0° and $\theta$=approximately 38.9° in the matching medium and between $\theta'$=approximately 32.9° and $\theta'$=approximately 90° in vacuum.

Figure 12:
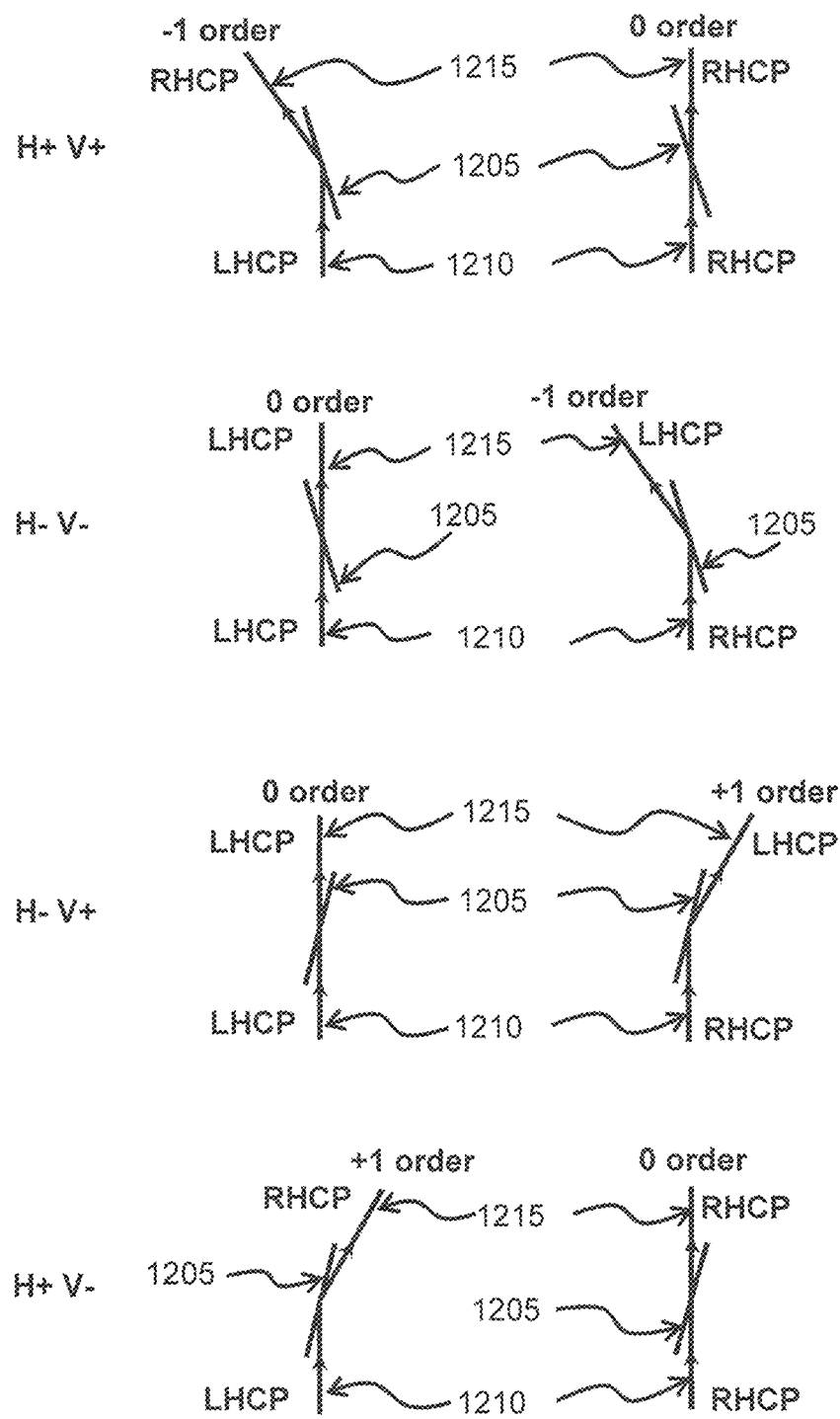
FIG. 12 illustrates the diffraction of light for the four types of PVGs, and for LHCP and RHCP light.

The results illustrated in FIG. 11 of calculations of the diffraction efficiency of an H+V+ PVG structure as a function of the ratio of the period $\Lambda_x$ to wavelength $\lambda$ can be extrapolated based symmetry principles to the other three types of PVG structure illustrated in FIG. 9. These symmetry principles include the invariance under reflection of the laws of electromagnetism. The results of this extrapolation are shown in FIG. 12. In those instances in FIG. 12 in which light is shown as being diffracted, it is expected that approximately 100% of light normally incident at the Bragg angle would be diffracted into the indicated diffraction order. In those instances in FIG. 12 in which light is shown as not being diffracted, it is expected that for periods $\Lambda_x/\lambda$≤approximately 1.84, at least approximately 90% of normally incident light would not be diffracted, or in other words, would exit the PVG with the same direction of propagation as at the input to the PVG.

In FIG. 12, planes of constant optical axis orientation 1205 diffract normally incident light 1210 mostly or entirely into one output order 1215. As indicated in FIG. 12, modeling and extrapolation based on symmetry principles indicate that LHCP light normally incident at the Bragg angle on an H+V+ PVG, or RHCP light normally incident at the Bragg angle on an H−V− PVG, will be entirely diffracted into the −1 order. Similarly, LHCP light normally incident at the Bragg angle on an H+V− PVG, or RHCP light normally incident at the Bragg angle on an H−V+ PVG, will be entirely diffracted into the +1 order. For all other combinations of circular polarization and PVG type, and for periods $\Lambda_x/\lambda$≤approximately 1.84, at least 90% of normally incident light would not be diffracted, or in other words, would exit the PVG with the same direction of propagation as at the input to the PVG. This undiffracted light is considered to be in the zero order of diffraction.

As is well known based on prior art, circularly polarized light diffracted from a CDW is of the opposite handedness as that of the incident light. For example, if the input light is LHCP, the diffracted light will be RHCP, and if the input light is RHCP, the diffracted light will be LHCP. As is also known based on prior art, the polarization of light that is not diffracted by a CDW is unchanged by its passage through the CDW. For example, if the input light is LHCP, the light emerging from the CDW that is not diffracted will also be LHCP, and if the input light is RHCP, the light emerging from the CDW that is not diffracted will also be RHCP. Based on our modeling, we found this to be the case with diffraction of light from PVGs as well, as indicated in FIG. 12.

Figure 13A:
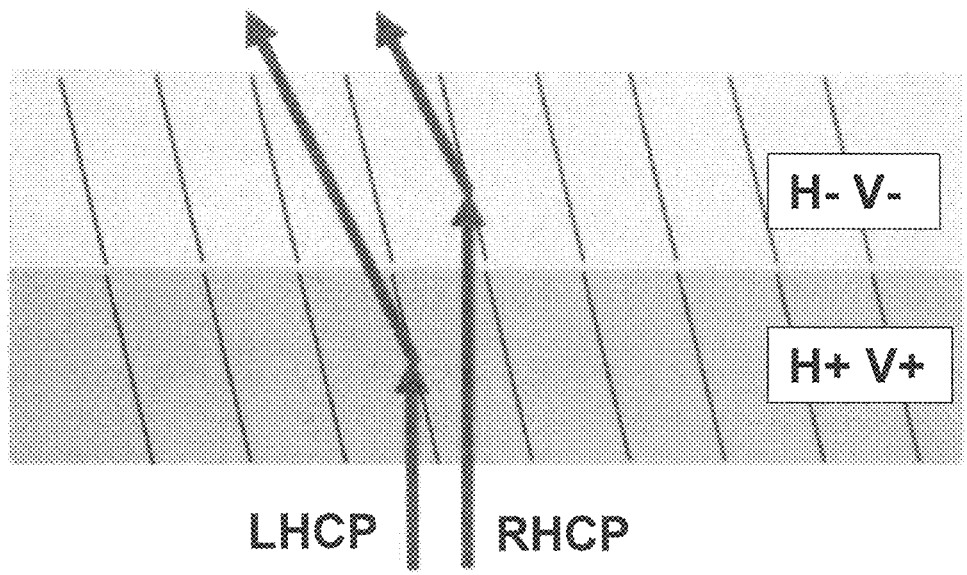
FIG. 13A illustrates the diffraction of light from a pair of PVGs, one of the configuration H+V+ as shown in FIG. 9, and the other of the configuration H−V− as shown in FIG. 9, with LHCP light diffracting primarily from the H+V+ PVG, and with RHCP light diffracting primarily from the H−V− PVG.
Figure 13B:
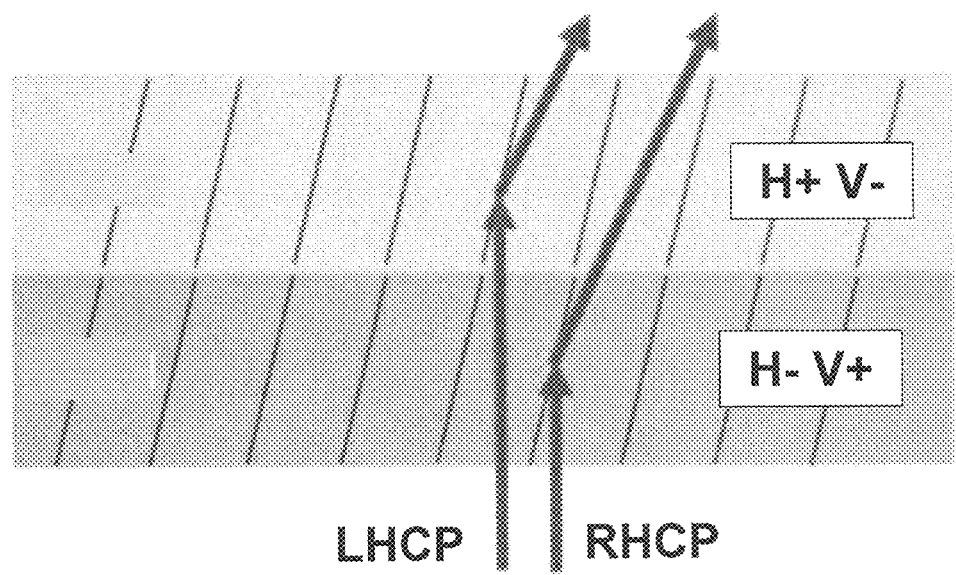
FIG. 13B illustrates the diffraction of light from a pair of PVGs, one of the configuration H−V+ as shown in FIG. 9, and the other of the configuration H+V− as shown in FIG. 9, with LHCP light diffracting primarily from the H+V− PVG, and with RHCP light diffracting primarily from the H−V+ PVG.
Figure 14A:
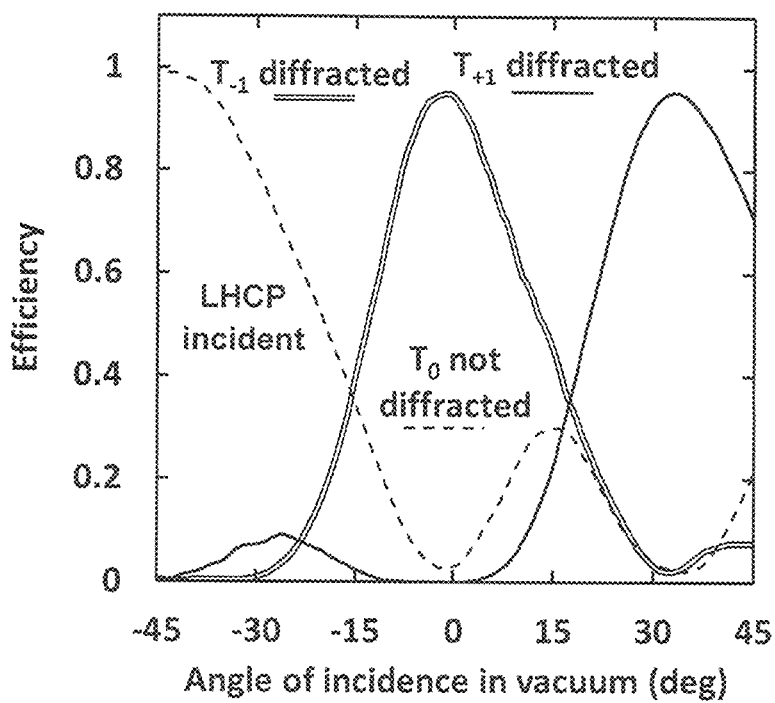
FIG. 14A illustrates the results of calculations of the efficiency with which light is diffracted or not diffracted from a pair of PVGs, with one of the PVGs of the pair in the configuration H+V+ as shown in FIG. 9, and the other in the configuration H−V− as shown in FIG. 9, as a function of the angle of incidence of LHCP light onto the PVG.

It is obvious then that the H−V− type of PVG with the same parameters as mentioned above would diffract normally-incident RHCP light while transmitting LHCP, as indicated in FIG. 12. These properties of PVGs make it possible to design a polarization-independent diffractive optical film for normally incident light consisting of a combination of H+V+ and H−V− PVGs (FIG. 13A), and by H−V+ and H+V− PVGs (FIG. 13B). Both of the PVGs must have the same period and twist angle magnitude for both polarizations to diffract in the same direction. Simulation shows that RHCP light is diffracted by the pair of PVGs with very high efficiency for the optimal diffraction angle in the matching medium of $\theta$=approximately 23.0° ($\theta'$=approximately 38.4° in vacuum). However, the diffraction efficiency of LHCP light is diminished substantially. The maximum achievable diffraction efficiency for unpolarized light with wavelength $\lambda$=approximately 633 nm is approximately 95.2% for a system with period $\Lambda_x$=approximately 1100 nm (i.e. $\Lambda_x/\lambda$=1.74) which corresponds to a diffraction angle in the matching medium of $\theta$=approximately 21.2° ($\theta'$=approximately 35.1° in vacuum). Angular response from our model of such an optimal pair of PVGs as illustrated in FIG. 13A is shown in FIG. 14 and visualization of beam paths for a narrow collimated laser beam is shown in FIG. 15. For FIG. 14, the wavelength assumed was approximately 633 nm and the PVG pair was H+V+ followed by H−V−, and the PVG grating period was $\Lambda_x$=approximately 1100 nm. The polarization of the normally incident light was LHCP for FIG.

Figure 14B:
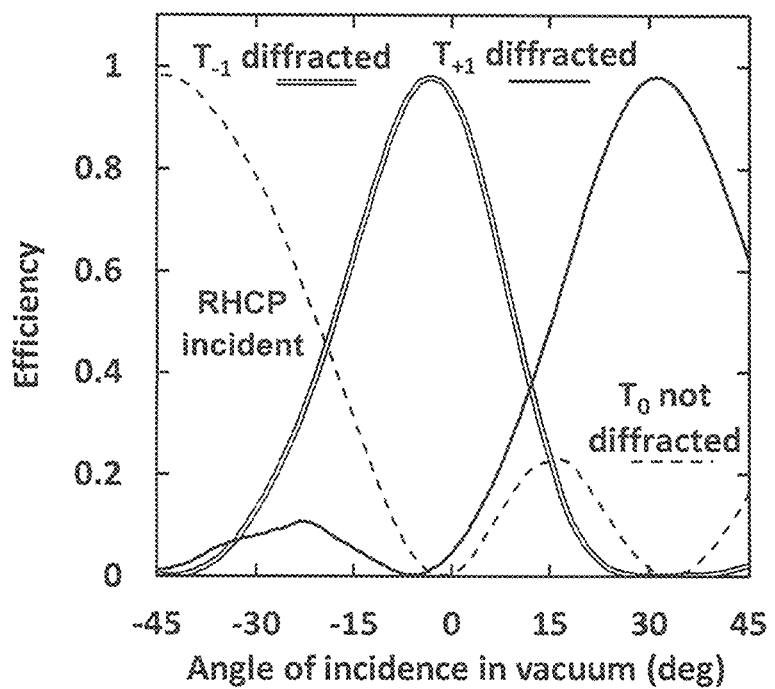
FIG. 14B illustrates the results of calculations of the efficiency with which light is diffracted or not diffracted from a pair of PVGs, with one of the PVGs of the pair in the configuration H+V+ as shown in FIG. 9, and the other in the configuration H−V− as shown in FIG. 9, as a function of the angle of incidence of RHCP light onto the PVG.
Figure 15A:
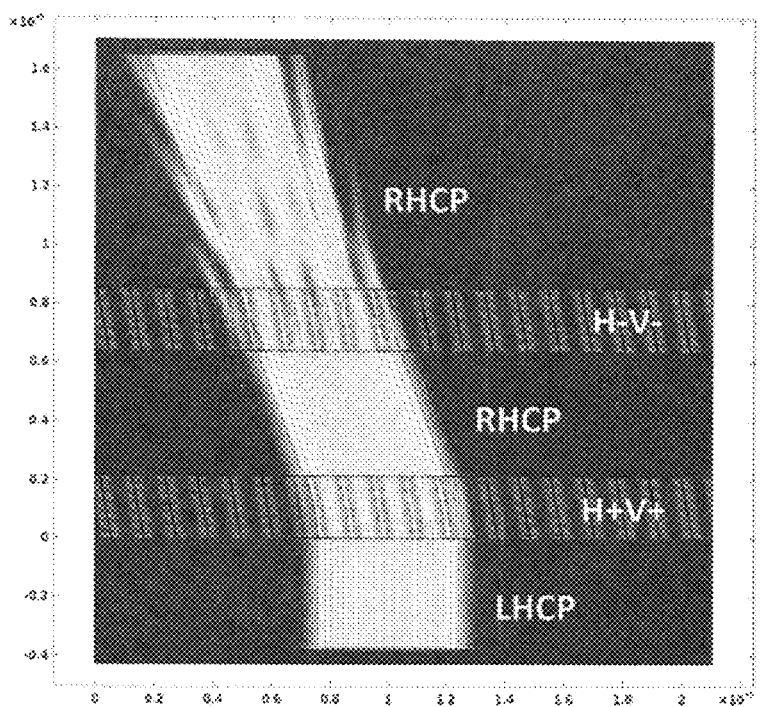
FIG. 15A illustrates the results of calculations of the diffraction of a beam of LHCP light by a pair of PVGs, with light normally incident on the PVGs, with the pair of PVGs designed such that the incident light diffracts at the Bragg angle.
Figure 15B:
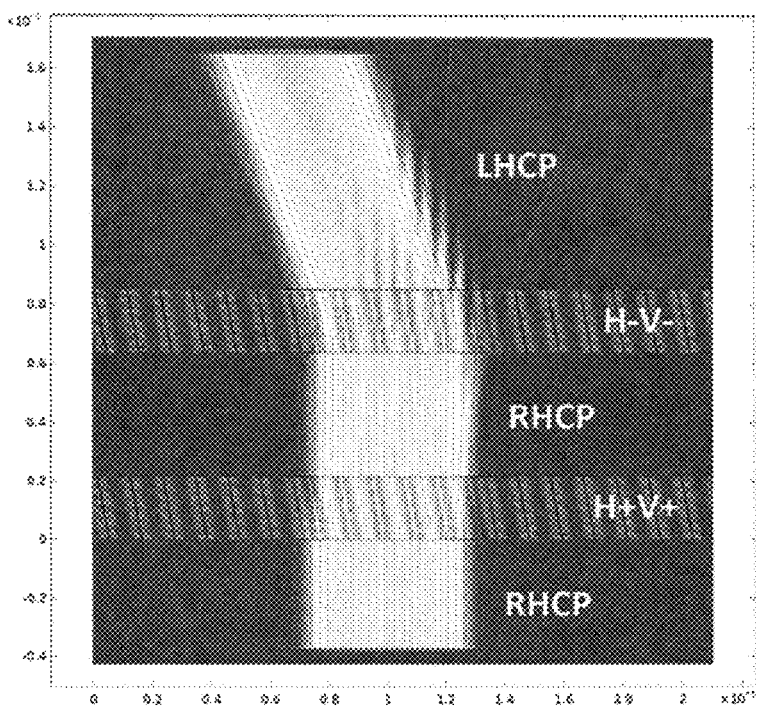
FIG. 15B illustrates the results of calculations of the diffraction of a beam of RHCP light by a pair of PVGs, with light normally incident on the PVGs, with the pair of PVGs designed such that the incident light diffracts at the Bragg angle.

14A and FIG. 15A, and RHCP for FIG. 14B and FIG. 15B. An important conclusion from FIG. 14 and FIG. 15 is that light of either polarization normally incident on the PVG pair is diffracted with high efficiency in the same direction, into the −1 order.

In order to experimentally demonstrate polarization-independent diffraction at normal incidence from a pair of PVGs, we recorded two PVGs, H+V+ and H−V− with a period of $\Lambda_x$=approximately 1097 nm, meeting the Bragg condition of Eq. (8). Diffraction of unpolarized light at 633 nm wavelength at normal incidence was observed with an efficiency of approximately 87%, which while not quite matching the 95% diffraction efficiency predicted by the model for unpolarized light, is nevertheless much higher than the maximum of approximately 50% predicted for any single-level PVG.

Our experimentally-validated simulation approach was further applied to more complex diffractive waveplate structures to obtain high efficiency for unpolarized light over a wide range of diffraction angles. Particularly interesting are diffractive waveplate lenses wherein the structure of the lens is such that all light of either polarization is brought to the same focal point. This is achieved by making the optical axis orientation angle in the plane of the film a quadratic function of the distance from a point in the plane. According to FIG. 11, over approximately 90% diffraction efficiency for unpolarized light of approximately approximately 633 nm wavelength can be achieved for grating periods $\Lambda_x$<approximately 1165 nm ($\Lambda_x/\lambda$<approximately 1.84), corresponding to diffraction angles in the medium θ>approximately 20° in the matching medium (or θ'>approximately 33° in vacuum). In an example of a four-layer lens structure, the first pair of PVG lenses diffracts light through an angle of approximately 42° in the matching medium. The second pair of PVG lenses diffracts the light in the opposite direction between approximately 21° and approximately 42° in the matching medium, resulting in an overall diffraction angle between 0° and approximately 21° in the matching medium (i.e. between 0° and approximately 35° in vacuum). This approach allows high diffraction efficiency for unpolarized light at all angles in vacuum between 0° and approximately 35°. As noted earlier, only a single pair of PVGs is required to obtain high diffraction efficiency for angles >approximately 35° in vacuum. Thus, by a combination of two-level and four-level combinations of PVGs, high diffraction efficiency for any polarization of light is attainable for essentially any diffraction angle.

Two specific applications of such two-level and four-level combinations of PVGs are described here. The first such application is a beam steering device in which the polarization-independent diffraction angle is the same over the entire area of the combination of PVGs, and the second such application is a polarization-independent spherical lens in which the diffraction angle as a function of lateral position over the area of the combination of PVGs is such as to bring all light incident on the combination of PVGs to the same focal point, regardless of polarization.

The beam steering device so defined is analogous to a CDW, in that the orientation of the director axis in any plane parallel to the surface of the PVGs depends on only one of the Cartesian coordinates in any such plane. By the method described in the previous paragraph, polarization-independent beam steering could thereby be obtained with a four-level combination of PVGs for any diffraction angle within the range of 0° and approximately 35° in vacuum, and polarization-independent beam steering for angles of >approximately 35° in vacuum can be obtained with a two-level combination of PVGs.

The second specific application is a combination of PVGs for focusing light of any polarization, as shown in FIG. 16A. The simulated dependence of diffraction efficiency as a function of lens f-number for unpolarized light shown in FIG. 16B is applicable for any wavelength provided the indices of refraction are chosen such as to fulfill the half-wave retardation condition.

Diffractive waveplate lenses with simpler structures reported previously focus light efficiently for only one circular polarization. The PVG beam steering devices and lenses described and modeled here would have all the major advantages of the previously reported diffractive waveplate lenses, including being thin and flat, but would diffract light efficiently for any polarization.

By changing the dependence of anisotropy axis orientation angle on the Cartesian coordinates in planes parallel to the surfaces of the PVGs, other optical functions can be achieved with the polarization-independent high-efficiency diffractive optical films herein described. Such other optical functions include an axicon action, produced by making the anisotropy axis orientation a linear function of a radial coordinate; and a cylindrical lensing function, produced by making the anisotropy axis orientation a quadratic function of a single Cartesian coordinate. As will be evident to those skilled in the art, other optical functions could be provided in a similar manner by appropriate selection of the dependence of optical axis orientation in the two Cartesian coordinates parallel to the plane of the film.

The term "approximately" is similar to the term "about" and can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A polarization-independent high-efficiency diffractive optical film comprising:
   a first layer of an anisotropic material, meeting a half-wave retardation condition at a selected operating wavelength, wherein orientation of anisotropy axis varies in space, rotating both in a plane of the first layer and around an axis perpendicular to the plane of the first layer;

a second layer of an anisotropic material, identical to the first layer in thickness and birefringence, parallel to the first layer, wherein orientation of anisotropy axis varies in space, rotating both in a plane of the second layer and around an axis perpendicular to the plane of the second layer, such that rates of change with distance of the anisotropy axis orientation in both the plane of the layer and around the axis perpendicular to the layer are equal in magnitude but opposite in sign to rates of change with distance of the anisotropy axis orientation of the first layer;

the anisotropy axis in the first and the second layer of the anisotropic materials varying linearly with distance in a direction perpendicular to a surface of the film within both the first layer and the second layer; and periods of rotation of the anisotropy axis in the first and the second layer of the anisotropic materials both parallel to the surface of the film and perpendicular to the surface of the film being chosen such that light normally incident on the film satisfies a Bragg condition at said selected operating wavelength for both the first layer and the second layer.

2. The polarization-independent high-efficiency diffractive optical film of claim 1, wherein anisotropy axis orientation angle in a plane of the film in the first and the second layer of the anisotropic materials varies linearly with one Cartesian coordinate in this plane, thereby providing a beam steering function.

3. The polarization-independent high-efficiency diffractive optical film of claim 1, wherein the anisotropy axis orientation angle in a plane of the film in the first and the second layer of the anisotropic materials varies as a quadratic function of distance from a point in the plane, thereby forming a high-efficiency, polarization-independent diffractive optical spherical lens.

4. The polarization-independent high-efficiency diffractive optical film of claim 1, wherein the anisotropy axis orientation angle in a plane of the film in the first and the second layer of the anisotropic materials varies as a quadratic function of one Cartesian coordinate in the plane, thereby forming a high-efficiency, polarization-independent diffractive optical cylindrical lens.

5. The polarization-independent high-efficiency diffractive optical film of claim 1, wherein anisotropy axis orientation angle in a plane of the film in the first and the second layer of the anisotropic materials varies as a linear function of a radial coordinate in the plane, thereby forming a high-efficiency, polarization-independent diffractive optical axicon.

6. A polarization-independent high-efficiency diffractive optical film comprising:

a first layer of an anisotropic material, meeting a half-wave retardation condition at a selected operating wavelength, wherein orientation of anisotropy axis varies in space, rotating both in a plane of the first layer and around an axis perpendicular to the plane of the first layer;

a second layer of an anisotropic material, identical to the first layer in thickness and birefringence, parallel to the first layer, wherein orientation of anisotropy axis varies in space, rotating both in a plane of the second layer and around an axis perpendicular to the plane of the second layer, such that rates of change with distance of the anisotropy axis orientation in both the plane of the layer and around the axis perpendicular to the layer are equal in magnitude but opposite in sign to rates of change with distance of the anisotropy axis orientation of the first layer;

the anisotropy axis in the first and the second layer of the anisotropic materials varying linearly with distance in a direction perpendicular to a surface of the film within both the first layer and the second layer;

periods of rotation of the anisotropy axis in the first and the second layer of the anisotropic materials both parallel to the surface of the film and perpendicular to the surface of the film being chosen such that light normally incident on the film satisfies a Bragg condition at said selected operating wavelength for both the first layer and the second layer;

a third layer of an anisotropic material, meeting a half-wave retardation condition having the selected operating wavelength of the first and second layers, parallel to the first layer, wherein orientation of anisotropy axis varies in space, rotating both in a plane of the third layer and around an axis perpendicular to the plane of the third layer;

a fourth layer of an anisotropic material, identical to the third layer in thickness and birefringence, parallel to the third layer, wherein orientation of anisotropy axis varies in space, rotating both in plane of the fourth layer and around an axis perpendicular to the plane of the fourth layer, such that rates of change with distance of the anisotropy axis orientation in both the plane of the fourth layer and around an axis perpendicular to the fourth layer are equal in magnitude but opposite in sign to the rates of change with distance of the anisotropy axis orientation of the third layer;

the anisotropy axis in the third and the fourth layer of the anisotropic materials varying linearly with distance in a direction perpendicular to a surface of the film within both the third layer and the fourth layer; and periods of rotation of the anisotropy axis in the third and the fourth layer of the anisotropic materials both parallel to the surface of the film and perpendicular to the surface of the film chosen such that light diffracted from the first pair of layers and incident on the second pair of layers satisfies a Bragg condition at the same selected operating wavelength as for the first layer and the second layer.

7. The polarization-independent high-efficiency diffractive optical film of claim 6, wherein anisotropy axis orientation angle in a plane of the film in the third and the fourth layer of the anisotropic materials varies linearly in one Cartesian coordinate in this plane, thereby providing a polarization-independent beam steering function.

8. The polarization-independent high-efficiency diffractive optical film of claim 6, wherein the anisotropy axis orientation angle in a plane of the film in the third and the fourth layer of the anisotropic materials varies as a quadratic function of a distance from a point in the plane, thereby forming a high-efficiency, polarization-independent diffractive optical spherical lens.

9. The polarization-independent high-efficiency diffractive optical film of claim 6, wherein the anisotropy axis orientation angle in a plane of the film in the third and the fourth layer of the anisotropic materials varies as a quadratic function of one Cartesian coordinate in the plane, thereby forming a high-efficiency, polarization-independent diffractive optical cylindrical lens.

10. The polarization-independent high-efficiency diffractive optical film of claim 6, wherein the anisotropy axis orientation angle in a plane of the film in the third and the fourth layer of the anisotropic materials varies as a linear function of a radial coordinate in the plane, thereby forming a high-efficiency, polarization-independent diffractive optical axicon.

11. A polarization-independent high-efficiency diffractive optical film comprising:
- a first layer of an anisotropic material, meeting a half-wave retardation condition at a selected operating wavelength, wherein orientation of anisotropy axis varies in space, rotating in a plane of the layer;
- a second layer of an anisotropic material, identical to the first layer in thickness and birefringence, parallel to the first layer, wherein orientation of anisotropy axis varies in space, rotating in a plane of the layer, such that rate of change with distance of the anisotropy axis orientation in the plane of the layer is equal in magnitude but opposite in sign to rate of change with distance of the anisotropy axis orientation of the first layer;
- period of rotation of the anisotropy axis parallel to the surface of the film being chosen such that light at a selected angle of incidence on the film satisfies a Bragg condition at a selected operating wavelength for both the first layer and the second layer.

12. The polarization-independent high-efficiency diffractive optical film of claim 11, wherein anisotropy axis orientation angle in a plane of the film in the first and the second layer of the anisotropic materials varies linearly in one Cartesian coordinate in this plane, thereby providing a polarization-independent beam steering function.

13. The polarization-independent high-efficiency diffractive optical film of claim 11, wherein anisotropy axis orientation angle in a plane of the film in the first and the second layer of the anisotropic materials varies as a quadratic function of distance from a point in the plane, thereby forming a high-efficiency, polarization-independent diffractive optical spherical lens.

14. The polarization-independent high-efficiency diffractive optical film of claim 11, wherein anisotropy axis orientation angle in a plane of the film in the first and the second layer of the anisotropic materials varies as a quadratic function of one Cartesian coordinate in the plane, thereby forming a high-efficiency, polarization-independent diffractive optical cylindrical lens.

15. The polarization-independent high-efficiency diffractive optical film of claim 11, wherein anisotropy axis orientation angle in a plane of the film in the first and the second layer of the anisotropic materials varies as a linear function of a radial coordinate in the plane, thereby forming a high-efficiency, polarization-independent diffractive optical axicon.

* * * * *